United States Patent
Dice et al.

(10) Patent No.: US 10,521,277 B2
(45) Date of Patent: Dec. 31, 2019

(54) SYSTEMS AND METHODS FOR SAFELY SUBSCRIBING TO LOCKS USING HARDWARE EXTENSIONS

(71) Applicant: Oracle International Corporation, Redwood City, CA (US)

(72) Inventors: David Dice, Foxboro, MA (US); Timothy L. Harris, Cambridge (GB); Alex Kogan, Needham, MA (US); Yosef Lev, New York, NY (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 94 days.

(21) Appl. No.: 14/736,123

(22) Filed: Jun. 10, 2015

(65) Prior Publication Data

US 2016/0011915 A1 Jan. 14, 2016

Related U.S. Application Data

(60) Provisional application No. 62/024,415, filed on Jul. 14, 2014.

(51) Int. Cl.
*G06F 9/52* (2006.01)
*G06F 9/46* (2006.01)

(52) U.S. Cl.
CPC .............. *G06F 9/526* (2013.01); *G06F 9/466* (2013.01); *G06F 9/467* (2013.01)

(58) Field of Classification Search
None
See application file for complete search history.

(56) References Cited

U.S. PATENT DOCUMENTS 8,495,607 B2 * 7/2013 Gschwind ............... G06F 8/443
717/110
2003/0037223 A1 * 2/2003 Steely, Jr. ............ G06F 9/3004
712/28

(Continued)

OTHER PUBLICATIONS

Ole Agesen, et al., "An Efficient Meta-lock for Implementing Ubiquitous Synchronization", Sun Microsystems, Apr. 1999, pp. 1-27.

(Continued)

*Primary Examiner* — Lewis A Bullock, Jr.
*Assistant Examiner* — Bruce S Ashley
(74) *Attorney, Agent, or Firm* — Robert C. Kowert; Kowert, Hood, Munyon, Rankin & Goetzel, P.C.

(57) ABSTRACT

Transactional Lock Elision allows hardware transactions to execute unmodified critical sections protected by the same lock concurrently, by subscribing to the lock and verifying that it is available before committing the transaction. A "lazy subscription" optimization, which delays lock subscription, can potentially cause behavior that cannot occur when the critical sections are executed under the lock. Hardware extensions may provide mechanisms to ensure that lazy subscriptions are safe (e.g., that they result in correct behavior). Prior to executing a critical section transactionally, its lock and subscription code may be identified (e.g., by writing their locations to special registers). Prior to committing the transaction, the thread executing the critical section may verify that the correct lock was correctly subscribed to. If not, or if locations identified by the special registers have been modified, the transaction may be aborted. Nested critical sections associated with different lock types may invoke different subscription code.

17 Claims, 8 Drawing Sheets

(56) References Cited

U.S. PATENT DOCUMENTS

| | | | | |
|---|---|---|---|---|
| 2005/0268106 | A1* | 12/2005 | Mansell | G06F 13/24 |
| | | | | 713/182 |
| 2007/0186056 | A1* | 8/2007 | Saha | G06F 9/466 |
| | | | | 711/144 |
| 2009/0007070 | A1* | 1/2009 | Magruder | G06F 9/466 |
| | | | | 717/120 |
| 2011/0246725 | A1* | 10/2011 | Moir | G06F 11/141 |
| | | | | 711/147 |
| 2012/0227045 | A1* | 9/2012 | Knauth | G06F 9/3863 |
| | | | | 718/100 |
| 2014/0040567 | A1* | 2/2014 | Pohlack | G06F 12/1027 |
| | | | | 711/152 |
| 2015/0074366 | A1* | 3/2015 | Calciu | G06F 9/467 |
| | | | | 711/163 |
| 2015/0277967 | A1* | 10/2015 | Calciu | G06F 9/528 |
| | | | | 711/147 |
| 2015/0378912 | A1* | 12/2015 | Gschwind | G06F 12/084 |
| | | | | 711/130 |
| 2015/0378927 | A1* | 12/2015 | Bradbury | G06F 12/0891 |
| | | | | 711/141 |

OTHER PUBLICATIONS

David F. Bacon, et al., "Thin Locks: Featherweight Synchronization for Java", Proceedings of the ACM Conference on Programming Language Design and Implementation, SIGPLAN, Jun. 1998, pp. 1-11, vol. 33, No. 6, Montreal, Canada.

Travis S. Craig, "Building FIFO and Priority-Queuing Spin Locks from Atomic Swap", Department of Computer Science and Engineering, University of Washington, Feb. 1, 1993, pp. 1-29, Seattle, Washington.

Luke Dalessandro, et al., "Hybrid NOrec: A Case Study in the Effectiveness of Best Effort Hardware Transactional Memory", ACM, ASPLOS'11, ACM, Mar. 5-11, 2011, pp. 1-13.

David Dice, "Brief Announcement: A Partitioned Ticket Lock", ACM, SPAA'11, Jun. 4-6, 2011, pp. 309-310, San Jose, California, USA.

David Dice, et al., "Applications of the Adaptive Transactional Memory Test Platform", Sun Microsystems, Inc., 2008, pp. 1-10.

Peter Magnusson, et al., "Queue Locks on Cache Coherent Multiprocessors", IEEE, 8th International Parallel Processing Symposium, Apr. 26-29, 1994, pp. 1-7.

Alexander Matveev, et al., "Reduced Hardware Transactions: A New Approach to Hybrid Transactional Memory", ACM, TRANSACT '13, Mar. 17, 2013, pp. 1-11, Houston, Texas USA.

John M. Mellor-Crummey, et al., "Algorithms for Scalable Synchronization on Share-Memory Multiprocessors", ACM Trans. on Computer Systems, Jan. 1991, pp. 1-41.

Ravi Rajwar, et al., "Speculative Lock Elision: Enabling Highly Concurrent Multithreaded Excecution", Proceedings of the 34th International Symposium of Microarchitecture (MICRO), Dec. 3-5, 2001, pp. 1-12, Austin, Texas.

Dave Dice, et al., "Adaptived Integration of Hardware and Software Lock Elision Techniques", ACM, SPAA'14, Jun. 23-25, 2014, pp. 1-10, Prague, Czech Republic.

* cited by examiner

SYSTEMS AND METHODS FOR SAFELY SUBSCRIBING TO LOCKS USING HARDWARE EXTENSIONS

This application claims benefit of priority of U.S. Provisional Application Ser. No. 62/024,415 entitled "Systems and Methods for Making Lazy Subscriptions to Locks Safe Using Hardware Extensions," filed Jul. 14, 2014, the content of which is incorporated by reference herein in its entirety.

BACKGROUND

Field of the Disclosure

This disclosure relates generally to synchronization mechanisms for use in concurrent programming, and more particularly to systems and methods for implementing techniques for safely subscribing to locks.

Description of the Related Art

Over the past decade, the focus of the computing industry has shifted from making faster computing cores to building systems with more cores per processor chip and/or more processor chips per system. Therefore, in order to continue to benefit from advances in technology, applications must be able to exploit increasing numbers of cores concurrently. Mutual exclusion locks and monitors represent two traditional concurrent programming synchronization mechanisms. Locks and monitors protect shared resources by separating accesses to them in time. For example, in some implementations, as long as a given thread of execution retains a lock on a shared object or resource, no other thread of execution can acquire the lock. Consequently, if threads must acquire the lock before modifying the object, any other thread attempting to modify the object is blocked from further execution until the lock is released.

However, traditional locking techniques are known to suffer from several limitations. Coarse-grained locks, which protect relatively large amounts of data, typically do not scale. For example, threads of execution on a multiprocessor system typically block each other even when they do not actually require concurrent access to the same addresses. Some fine-grained locks resolve some of these contention issues, but in traditional locking techniques, this resolution may be achieved at the cost of added programming complexity and the increased likelihood of problems such as deadlocks. Various existing locking schemes can also lead to an increased vulnerability to thread failures and delays. For example, a thread that is preempted or that performs expensive input/output operations while holding a lock can obstruct other threads for relatively long periods, thereby potentially reducing the overall throughput of the system.

Transactional Memory™ is a promising concurrency control technology that aids programmers writing parallel programs to perform correct data sharing between concurrent computations (which commonly manifest as "threads"). Transactional memory is widely considered to be the most promising avenue for addressing issues encountered in concurrent programming and execution. Using transactional memory, programmers may specify what should be done atomically, rather than how this atomicity should be achieved. The transactional memory implementation may then be responsible for guaranteeing the atomicity, largely relieving programmers of the complexity, tradeoffs, and software engineering problems typically associated with concurrent programming and execution. In general, transactional memory may be implemented in hardware, with the hardware transactional memory (HTM) directly ensuring that a transaction is atomic, or as software transactional memory (STM) that provides the "illusion" that a transaction is atomic, even though in fact it is executed in smaller atomic steps by underlying hardware. HTM solutions are generally faster than STM ones, but so-called "best-effort" HTM implementations may not be guaranteed to be able to commit any particular transaction. Recently developed Hybrid Transactional Memory (HyTM) implementations may allow transactions to be executed using hardware transactional memory if it is available (and when it is effective), or using software transactional memory otherwise.

Transactional Lock Elision (TLE) uses Hardware Transactional Memory (HTM) to execute unmodified critical sections concurrently, even if they are protected by the same lock. To ensure correctness, the transactions used to execute these critical sections "subscribe" to the lock by reading it and checking that it is available. A recent paper proposed using the tempting "lazy subscription" optimization for a similar technique in a different context, namely transactional systems that use a single global lock (SGL) to protect all transactional data.

SUMMARY

Transactional Lock Elision (TLE) allows hardware transactions to execute unmodified critical sections concurrently, even when protected by the same lock. To ensure correctness using this approach, the hardware transactions used to execute these critical sections "subscribe" to the shared lock by reading it and checking that it is available. A proposed "lazy subscription" optimization, which delays lock subscription, can, by propagating inconsistent state observed during or after execution of the critical section, potentially cause behavior that cannot occur when the critical sections are executed under the lock. In some embodiments, the hardware extensions described herein may provide mechanisms to ensure that lazy subscriptions are safe (e.g., that they result in correct behavior, meaning, in this context, behavior that is consistent with that which is possible when the critical sections are executed under the lock) over a wide range of potential scenarios and conditions.

In some embodiments of the systems described herein, prior to executing a critical section transactionally, its associated lock and the subscription code for subscribing to that lock may be identified (e.g., by writing their locations to special registers or to locations in a protected memory area). Prior to committing the transaction, the thread executing the critical section may verify that the correct lock was correctly subscribed to. If not, or if locations identified by the special registers have been modified, the transaction may be aborted.

In some embodiments, multiple critical sections within a multithreaded application (e.g., nested critical sections) may be associated with different lock types, and each such critical section may invoke different subscription code. For example, depending on the lock type, subscribing to the lock may include one or more of: reading the values of one or more registers or memory locations that are associated with the lock, dereferencing a pointer to a location storing lock state information, comparing the values of two registers or memory locations that are associated with the lock to respective expected values, comparing a lock state value to a value indicating that the lock is available, or applying a bitmask to a value that comprises a lock state and other information to obtain the lock state information. In some embodiments, the hardware transactions executing a nested critical section and its enclosing critical section may be committed only if both have successfully subscribed to their locks. Otherwise, one may be aborted if the other fails to commit or if the other is prevented from committing because it did not correctly subscribe to the correct lock (or for other reasons, including issues involving multiple nested critical sections, or nested critical sections that have been flattened into a single critical section). For example, in some embodiments, some nested critical sections may be executed within the same hardware transaction as their enclosing critical section, which may involve tracking the nesting depth (e.g., using a counter) and committing the complete nest of critical sections only when the outermost critical section commits and then only when and if all of the critical sections have correctly subscribed to their respective correct locks.

In some embodiments, if a hardware transaction aborts, the thread executing the critical section may retry execution of the critical section using a hardware transaction one or more times (e.g., up to a predetermined maximum number of times or according to an applicable retry policy) before abandoning its TLE attempt and acquiring the lock. In some embodiments, determining whether a lock is available may include repeatedly reading a value of a lock state indicator using a non-transactional load until the value indicates that the lock is available.

Figure 1:
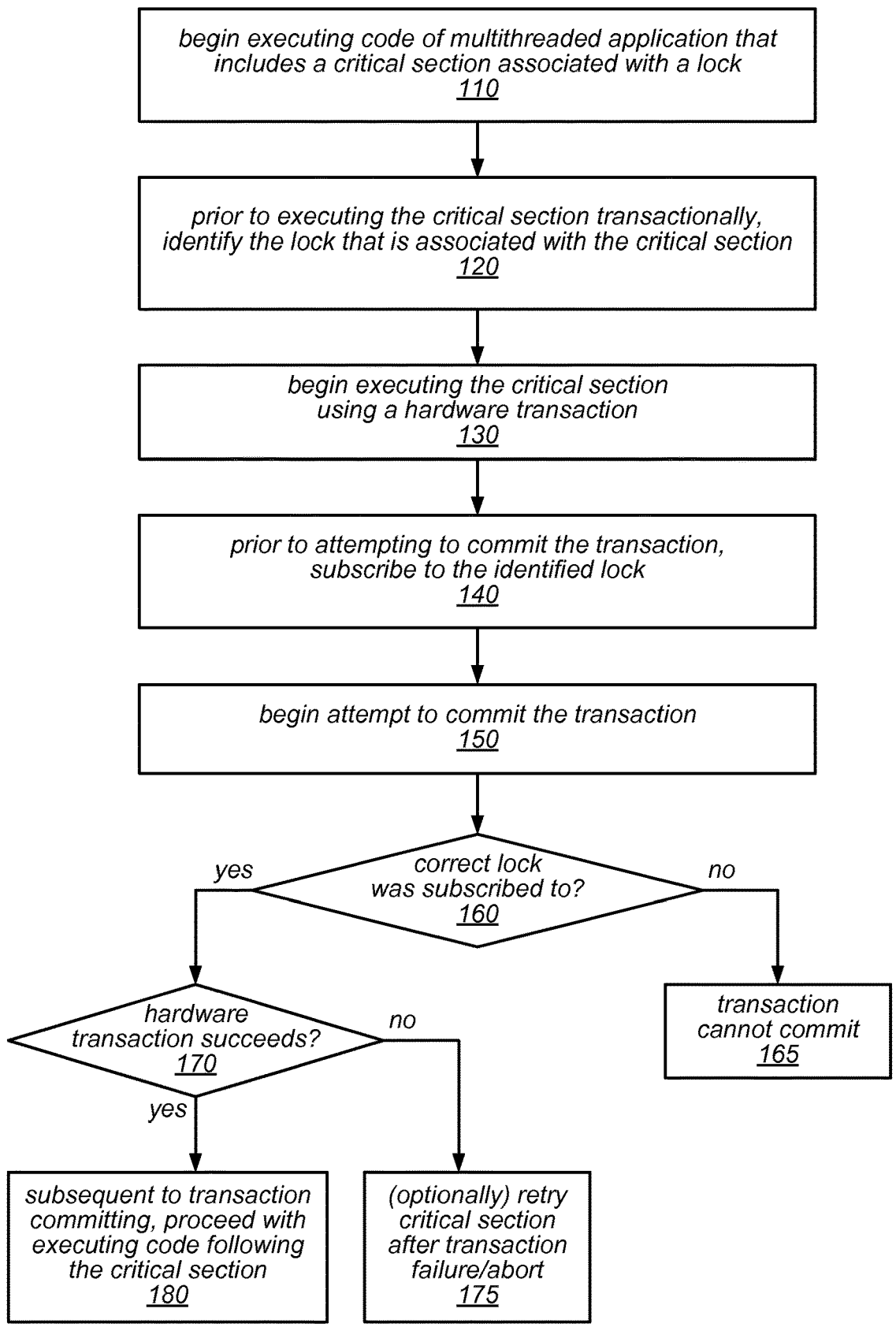
FIG. 1 is a flow diagram illustrating one embodiment of a method for safely implementing a lazy subscription to a lock, as described herein.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, Transactional Lock Elision (TLE) uses Hardware Transactional Memory (HTM) to execute unmodified critical sections concurrently, even if they are protected by the same lock. Using this approach, to ensure correctness, the transactions used to execute these critical sections "subscribe" to the shared lock by reading it and checking that it is available. In some implementations, TLE may improve scalability without requiring code changes. A "lazy subscription" optimization, which delays lock subscription has been described in the literature. However, several pitfalls have been identified showing that lazy subscription is not safe for TLE because unmodified critical sections that execute before subscribing to the lock may behave incorrectly in a number of subtle ways. It has also been shown that recently proposed compiler support for modifying transaction code to ensure that subscription occurs before any incorrect behavior could manifest is not sufficient to avoid all of the potential pitfalls, including, but not limited to, those described herein. It may be argued that extending such compiler support to avoid all pitfalls would add substantial complexity, which may limit the extent to which subscription can be deferred, undermining the effectiveness of the optimization. Furthermore, the use of compiler support may require recompilation or translation of critical sections, limiting the applicability of such techniques compared with alternative techniques which can operate on unmodified code.

It has also been determined that hardware extensions suggested in the recent proposal do not address all of the pitfalls described herein. However, in some embodiments, the hardware extensions described herein may make lazy subscription safe, both for SGL-based transactional systems and for TLE, without the need for special compiler support. In some embodiments, non-transactional loads may be exploited, if available, to further enhance the effectiveness of lazy subscription.

INTRODUCTION

As noted above, Hardware Transactional Memory provides hardware support for atomically executing a section of code, without requiring programmers to determine how this atomicity is achieved. Numerous techniques for exploiting HTM to improve the performance and scalability of concurrent programs have been described in the literature.

One of the simplest and most readily exploitable of these techniques may be Transactional Lock Elision, which targets existing lock-based applications without requiring them to be restructured and without requiring modifications to critical section code (e.g., code that accesses a shared resource protected by a lock). In various embodiments, TLE uses a hardware transaction to atomically apply the effects of a critical section without acquiring the lock, thereby allowing critical sections protected by the same lock to be similarly executed concurrently by other threads, provided their data accesses do not conflict.

In some embodiments, because hardware transactions invoked under TLE may fail due to read or write conflicts, or due to limitations of the HTM implementation, some critical sections may still need to be executed in the traditional manner (i.e., not in a hardware transaction) after acquiring the lock. To ensure that a critical section executed in a hardware transaction does not observe any partial effects of a critical section executed by another thread that acquires the lock, the transaction may "subscribe" to the lock. In some embodiments, subscribing to the lock may include reading the state of the lock and confirming that the lock is available. In various embodiments, similar techniques may be used to implement a transactional memory system in which all transactional data is protected by a single global lock (SGL), and in which transactions may executed either by acquiring the lock, or within a hardware transaction that subscribes to the lock.

In some embodiments, subscribing to the lock may make hardware transactions vulnerable to abort if another thread acquires the lock. Typically, transactions may subscribe to the lock at the beginning of the critical section, making them vulnerable to such an abort during the entire execution of the critical section. It is therefore tempting to use a lazy subscription optimization, which delays lock subscription, in order to reduce the duration of this vulnerability. As noted above, this technique was recently proposed for SGL-based transactional systems.

A simple (but incorrect) way to implement lazy subscription for TLE may be to delay subscription until immediately before committing the transaction. This way the implementation may affect only library code and may not require analysis or modification of critical section code, thus retaining an important benefit of TLE. One might reason that this "lazy subscription" technique is safe for TLE on the grounds that the hardware transaction may ensure that all of the memory accesses performed by the critical section, together with the check that the lock is not held, are performed atomically, and therefore the effects of committing the transaction are identical from the perspective of other threads. Unfortunately, as described in more detail herein, there may be subtle problems with this approach. In fact, it has been shown that TLE with lazy subscription may be subject to a number of pitfalls that can violate correctness by changing the semantics of a multithreaded application that employs this technique.

Because SGL-based transaction systems generally require static analysis of all code that could potentially be executed within transactions, there may be an opportunity for the compiler to recognize situations in which transactions could potentially behave incorrectly, and to ensure they subscribe to the lock before allowing this possibility. However, it has been shown that the analysis proposed in the literature is not sufficient to avoid all of the pitfalls described herein. Furthermore, it may be argued that it is unlikely to be practical to enhance the static analysis to make lazy subscription safe while retaining its benefits because subscription will be required relatively early in all but very simple cases.

Hardware extensions are briefly described in the literature that the authors have claimed would allow these issues to be avoided entirely. However, it has been shown that these extensions are not sufficient to avoid all of the pitfalls described herein. By contrast, in some embodiments of the systems described herein, HTM implementations may be enhanced to make lazy subscription safe for both TLE and SGL-based transaction implementations, without special compiler analysis. In various embodiments, the techniques described herein may be even more effective if the extended HTM implementation supports non-transactional loads.

In some embodiments, the hardware enhancements described herein may be both practical and implementable, but may require a nontrivial increase in cost and/or complexity. However, preliminary results suggest that the benefits of such optimizations may, in at least some cases, justify the cost and complexity required by hardware extensions to make them safe.

TLE and Lazy Subscription

TLE may typically be implemented by modifying lock library code so that the lock acquire method begins a hardware transaction, checks that the lock is available and, if so, allows the critical section to execute without acquiring the lock. This lock "subscription" adds the lock to the read set of the transaction, so that the transaction will abort if the lock is subsequently acquired before it commits. If the lock is not available, the transaction is aborted and the critical section execution attempt may be retried, either in another hardware transaction or by acquiring the lock and executing the critical section as usual (e.g., without a hardware transaction). The lock release method may commit the transaction if the critical section was executed in a transaction, or may release the lock, otherwise.

This approach to implementing TLE may be further illustrated by the example pseudo code below (e.g., in lines 1-17), where the "use_TLE" and "using_TLE" methods abstract away practical details such as whether and how long to back off before retrying, whether to wait for the lock to be available before retrying, how many attempts to make using HTM before giving up and acquiring the lock, whether and/or how to support nesting, and/or how the release method determines whether the acquire method choses to use TLE. For example, in various embodiments, if the hardware transaction fails on its first attempt to execute the critical section, it may be retried one or more times in accordance with an applicable retry policy (e.g., one that specifies a pre-determined maximum number of retry attempts, or that specifies other criteria for determining when and if to retry the critical section using HTM). However, these issues may or may not be relevant to correctness, in different embodiments (e.g., depending on the specific lock types, methods, and contexts in which these details are applied and/or on the correctness of the implementation of the methods themselves).

The example pseudo code below illustrates basic TLE (e.g., in lines 1-17) and a lazy subscription version (e.g., in lines 21-37). Note that in this example, the "txbegin" instruction specifies a label to which control branches if the transaction aborts for any reason. The "use_TLE" method represents a policy decision about whether to use TLE, and the "using_TLE" method returns the value most recently received by the thread from "use_TLE". These methods take an argument identifying the lock, which may enable support for general locking patterns. However, this may not be needed if locking is assumed to be properly nested.

```
 1    acquire(lock L) {
 2    retry:
 3        while (use_TLE(L)) {
 4            txbegin retry;
 5            if (isLocked(L))
 6                txabort;
 7                return;
 8        }
 9        < acquire lock L >
10    }
12    release(lock L) {
13        if (using_TLE(L))
```

-continued

```
14      txcommit;
15    else
16    < release lock L >
17  }
21  acquire(lock L) {
22  retry:
23    while (use_TLE(L)) {
24      txbegin retry;
25      return;
26    }
27    < acquire lock L >
28  }
30  release(lock L) {
31    if (using_TLE(L)) {
32      if (isLocked(L))
33        txabort;
34      txcommit;
35    } else
36      < release lock L >
37  }
```

A TLE transaction executed using the technique illustrated in lines 1-17 of the example pseudo code above includes the lock in its read set throughout the execution of the critical section. Thus, any critical section that acquires the lock in this entire duration will cause the transaction to abort. One might consider it an advantage to abort such transactions earlier, given that they may waste less work in this case. However, this reasoning overlooks the fact that in many cases the abort may not be necessary. For example, the abort may not be necessary in situations in which the critical sections executing in the transaction and with the lock held do not conflict. In this case, in may be preferable to avoid an early abort.

Using basic lazy subscription, such as illustrated in lines 21-37 of the example pseudo code above, the subscription may be moved from the acquire method to the release method. This may allow the transaction to execute the entire (unmodified) critical section without subscribing, with the understanding that it would attempt to do so before committing (and that the transaction will fail if reading the lock state reveals that the lock is held). Unfortunately, during execution, a transaction may fail to reach the release method in the anticipated manner, and thus may fail to subscribe to the lock. For example, if a critical section executed in a transaction observes values in memory that it could not have observed if all critical sections were executed while holding the lock, the observing critical section may exhibit different behavior than what was intended by the programmer who wrote the critical section code.

One might argue that this is also not a problem, as follows: The transaction will try to commit only after subscribing to the lock and observing that the lock is available, implying that its read set has a consistent view of memory. Therefore, if the transaction saw an inconsistent view of memory, the normal HTM mechanisms will cause it to abort. This is the essence of the "intuitive" correctness argument found in the literature. However, this argument incorrectly assumes that the transaction will eventually execute the correct subscription code and observe the correct lock state before attempting to commit. If this is not the case, the transaction may erroneously commit, with unpredictable effects. A number of ways in which the transaction may fail to correctly subscribe to the lock are described below.

Pitfalls of Lazy Subscription

As noted above, the basic lazy subscription approach described in the literature can cause a transaction to deviate from the behavior that would have been allowed by the original program in a variety of ways. Some of these behaviors may be benign, e.g., in cases in which the transaction aborts and, therefore, its effects are not observed by other threads. In particular, most HTM implementations ensure that, if a transaction executes code that would ordinarily cause the program to crash (such as divide-by-zero), it simply aborts. However, there are a number of ways in which a transaction that deviates from the original program's behavior can commit successfully, resulting in observably incorrect behavior, some of which are described in more detail below.

Observing Inconsistent State:

If a thread executes a critical section without acquiring or subscribing to the lock, this can result in the thread's registers containing values that could never have occurred in an execution of the original program (e.g., when each critical section is executed by a thread that holds the appropriate lock). This is illustrated by the example pseudo code below, in which a shared variable "next_method" indicates the method to perform the next time "apply_next" is invoked. In this example, an indirect branch that is executed within a transaction has an unpredictable target. For example, if the critical section is executed in a transaction using the basic lazy subscription approach, at line 9 it may observe the value of next_method as 2 because another thread that is executing the critical section while holding the lock is just about to reset next_method to zero (at line 11). By contrast, the use of the lock in the original program ensures that no thread ever reads 2 from next_method.

```
1   void (*method_table[2])( ) = {method1, method2};
3   int next_method = 0;
5   lock L;
7   void apply_next( ) {
8     acquire(L);
9     (*method_table[next_method])( );
10      if (++next_method ≥ 2)
11        next_method = 0;
12    release(L);
13  }
```

A number of ways in which such inconsistent state can lead to observably incorrect behavior are described below.

Indirect Branch:

Continuing the example illustrated in the pseudo code above, after a transaction (incorrectly) reads 2 from next_method, it reads the value stored immediately after the method_table array and treats it as a function pointer, invoking the "code" at that address. Because this address may point to any code or data, the result of executing "code" stored at this address is unpredictable. In particular, the "code" may commit the transaction after writing some arbitrary value(s) to arbitrary memory location(s), without the transaction ever having subscribed to the lock.

This example illustrates that a thread executing a critical section in a transaction that has not yet subscribed to the lock can observe values in memory that it could never have observed in any execution of the original program and that it can commit nonetheless, resulting in observably incorrect behavior. While this example may be sufficient to conclude that the basic lazy subscription approach should not be blindly used for TLE with unmodified critical section code, there are many other ways in which reading inconsistent values from memory can indirectly result in incorrect behavior, some of which are described below.

Propagating Inconsistent State:

Once a thread's registers are in a state that is not allowed in the original program, this inconsistency can, in some cases, propagate through the thread's state in numerous ways, resulting in behaviors that are different from those that could be observed in an execution of the original program:

Inconsistent values may propagate between registers via arithmetic operations, register moves, etc.

Inconsistent values in registers may propagate to memory written by the transaction explicitly or implicitly (e.g., arguments to method calls, register spills).

Inconsistent register values may be used as addresses for stores to memory, resulting in locations being written that would not have been written by the transaction in an execution of the original program.

Inconsistent values written to memory or to inconsistent locations may propagate back to registers via loads, either explicitly or implicitly.

Conditional control flow may differ.

These effects may be benign in some cases (e.g., if the transaction aborts). However, in other cases they can lead to the transaction committing without correctly subscribing to the lock in a number of ways, some of which are discussed below.

Conditional Code that Commits the Transaction:

If a condition in a transaction executing before subscribing to the lock evaluates differently than it should have because of an inconsistent value in a register, then a code path may be executed that would not have been executed by the original program. Assuming that the basic lazy subscription approach is applied to arbitrary, unmodified critical section code, the possibility that this code could commit the transaction without subscribing to the lock cannot be ruled out.

Lock Scribbling:

A memory write that uses an inconsistent register for its target address may overwrite the lock protecting the critical section with a value that makes it appear to be available. In this scenario, even if the correct lock subscription code is executed and subscribes to the correct lock, it may incorrectly conclude that the lock is available and commit the transaction. Furthermore, the transaction write via the inconsistent pointer may actually release the lock. In this case, once the transaction commits, the lock may be in a released state before the thread that acquired it has exited the critical section.

Subscribing to the Wrong "Lock":

If the address of the lock protecting the critical section is stored in a register or memory location that is inconsistent, then even if the correct subscription code is executed, the transaction may incorrectly conclude that the lock is available and commit.

Self-Modifying Code:

Similar to lock scribbling, if a transaction that has observed inconsistent state writes incorrect values to memory, or writes to an incorrect address, the transaction could execute code that it has itself incorrectly written. Again, this could result in committing the transaction without having correctly subscribed to the lock.

Corrupted Return Address:

An additional concrete example illustrates how an inconsistent value read from memory can propagate in a manner that causes the transaction to commit without subscribing to the lock. In this example, similar to the indirect branch example above, a transaction using lazy subscription (e.g., basic lazy subscription) reads a value from memory that it could never have read in the original program. In this example, the transaction uses this value as an index into a stack-allocated array and writes to memory at the indexed location. In this case, if the inconsistent value is not a valid index into the array, the target location may happen to be the stack location containing the function's return address, and the value written may happen to be the address of the instruction that commits the transaction. In this scenario, when the function returns, it will execute the instruction to commit the transaction without ever having attempted to subscribe to the lock.

Avoiding the Pitfalls Via Compiler Support

As previously noted, TLE may be a promising way to exploit HTM in the short term because it can be applied to unmodified critical sections, with no special compiler support. For example, while modifying critical sections may be required in order to achieve the best performance, it may not be required in order to ensure correctness. As explained above, a lazy subscription approach cannot be applied to TLE without sacrificing this important property.

In the context of SGL-based transactional systems, compiler support for analyzing code to be executed in transactions may typically be required regardless. Therefore, there may be an opportunity for the compiler to analyze and modify such code in order to make lazy subscription safe. Indeed, others have proposed that the compiler could ensure that transactions subscribe to the lock before executing an indirect branch in order to avoid the indirect branch pitfall described above. Note, however, that this approach has been suggested only for the case in which a transaction has already written to memory. However, the indirect branch example illustrated above demonstrates that this may not be sufficient, as the transaction does not write to memory before executing the indirect branch.

Those who have proposed that the compiler could ensure that transactions subscribe to the lock before executing an indirect branch may have assumed that the compiler would conservatively disallow the use of instructions that would commit the transaction within any code that could potentially be executed within a transaction. This would avoid the "conditional code that commits the transaction" pitfall. However, they did not identify the remaining pitfalls described above, nor did they propose any mechanisms that would avoid them. Given the diverse range of ways in which a transaction may commit incorrectly, it may be argued that any static analysis that is sufficient to ensure correctness would entail significantly more complexity than is suggested in the literature. The complexity required by such static analysis may be mitigated to some degree by conservatively subscribing to the lock to avoid the need to precisely determine whether the transaction may violate correctness, in various cases. However, this may reduce the effectiveness of the lazy subscription optimization.

Given the numerous ways in which inconsistency can propagate and manifest, even maximally precise analysis will likely require relatively early subscription. For example, the corrupted return address pitfall suggests that subscription is necessary prior to the first time that a transaction returns from a function call after reading a potentially-inconsistent value from memory and subsequently performing a write, even to its own stack. Applying this rule precisely may, in some cases, require an analysis that ensures any record of whether the transaction has previously read from memory is accurate. However, in embodiments in which there are no calls to functions via function pointers (meaning that a static analysis can be used to determine exactly which functions may be called from within the transaction), it may be sufficient to keep track of when any of these functions executes its first write, and to subscribe to the lock at that point.

Similarly, avoiding the "subscribing to the wrong lock" pitfall may require the transaction to ensure that its notion of which lock it is eliding is not corrupted by propagating inconsistent data. Avoiding "lock scribbling" may require not only a reliable record of the lock's address, but also knowledge of the structure of the lock, unless the compiler is so conservative that it does not allow any writes to memory based on a potentially-inconsistent address register prior to subscription.

It seems clear that at least some safe deferral of lock subscription may be possible with a sufficiently precise or conservative analysis. However, it is believed that the complexity required to make lazy subscription safe using software techniques alone is unlikely to be worthwhile, given the degree to which subscriptions are able to be deferred in practice.

Note also that hardware extensions that have been briefly described in the literature have been shown to be insufficient to avoid all of the pitfalls described above. In particular, although the proposed extensions may ensure that the correct lock is subscribed to before a transaction commits, there is no mechanism proposed to avoid the "lock scribbling" pitfall.

Making Lazy Subscription Safe and Effective

In various embodiments, the systems described herein may employ hardware extensions to support lazy subscription in a manner that ensures that the lock and the method for subscribing to it are identified before beginning transactional execution of a critical section, and that ensures that the transaction correctly subscribes to the identified lock using the identified method before committing, regardless of what code the transaction executes. Note that this and other information discussed below may only need to be recorded before any actions that could potentially corrupt the information being recorded are taken. However, because recording this information does not make the transaction more vulnerable to abort, it may not be worthwhile to complicate an implementation in order to delay this recording.

One embodiment of a method for safely implementing a lazy subscription to a lock is illustrated by the flow diagram in FIG. 1. As illustrated at 110, in this example, the method may include beginning to execute code of a multithreaded application that includes a critical section associated with a lock. The method may also include, prior to executing the critical section transactionally, identifying the lock that is associated with the critical section, as in 120. As described in more detail below, in some embodiments, identifying the lock may include storing an identifier or location of the lock (e.g., the location at which the lock resides in a hardware transactional memory, i.e., a memory for which accesses may be mediated by hardware transactions) in a special-purpose register. After identifying the lock, the method may include beginning to execute the critical section using a hardware transaction, as in 130.

As illustrated in this example, the method may include, prior to attempting to commit the transaction, subscribing (or at least attempting to subscribe) to the identified lock, as in 140. As described in more detail herein, various methods may be employed for subscribing to the lock, in different embodiments. The method may also include beginning an attempt to commit the transaction, as in 150.

In this example, if the correct lock was not successfully subscribed to (e.g., if the wrong lock was subscribed to or if an attempt to subscribe to the correct lock was unsuccessful), the transaction cannot commit. This is illustrated in FIG. 1 by the path from the negative exit of 160 to 165. In various embodiments, the system may be configured to refrain from committing the transaction, in this case, either by explicitly aborting the transaction or causing the transaction to be aborted, or by otherwise preventing the transaction from committing (e.g., by suspending the thread at that point, which may not violate correctness). However, if the correct lock was successfully subscribed to (shown as the positive exit from 160), and if the hardware transaction itself succeeds (shown as the positive exit from 170), the transaction may commit (e.g., the transaction may be allowed to commit), after which execution of the code following the critical section may proceed (as in 180). Otherwise, shown as the negative exit from 170, the transaction may fail and/or otherwise be aborted, after which the critical section may (optionally) be retried (as in 175).

Note that, in various embodiments, the techniques described herein may be integrated with different HTM implementations in different ways. Persons sufficiently skilled in the art to design HTM features that do not employ lazy subscription may readily adapt their designs to employ lazy subscription, given benefit of the descriptions included herein. Furthermore, many variations and alternatives for achieving the same effect will be appreciated by such persons skilled in the art. The descriptions included herein are illustrative of a class of techniques that will be described by the claims appended below. A relatively simple basic approach is presented first, followed by more complex approaches that address its limitations.

A Basic Approach

In some embodiments, it may be preferable that transactions are limited to execute only for a bounded number of instructions or cycles. This may avoid the possibility that a critical section that is executed with lazy subscription goes into an infinite loop due to observing transient data. Without this restriction, another solution may be needed to avoid this possibility, such as requiring transactions to subscribe to a special variable that is periodically modified. Note, however, that most, if not all, existing HTM implementations include a limit on transaction length.

In this example approach, a special register called the lock address register (LAR) may be added (which may implemented in circuitry within a processor or another component), and the value stored in this register may be set to the address of the lock that is associated with a critical section before beginning transactional execution of the critical section. In this example, any attempt to modify the contents of the LAR during transactional execution, or any attempt by the thread executing the transaction to write to the address it references, may cause the transaction to abort. In addition, any attempt to commit an outermost hardware transaction (i.e., one that is not nested within another hardware transaction) may cause the location identified by the LAR to be read transactionally and compared to zero. If the comparison fails, then the transaction may be aborted. This approach may, in various embodiments, be relatively simple to implement, but may suffer from several limitations, which are described later. Note that, in some embodiments, rather than configuring the system so that a modification of the LAR (or the lock itself) causes the transaction to abort, the system may be configured so that the LAR, once written to, cannot be modified. In still other embodiments, rather than using a special-purpose register to hold the lock address information, this information may be stored in a location in a protected memory area (e.g., one that cannot be modified, or one whose modification would could the transaction to abort).

Figure 2:
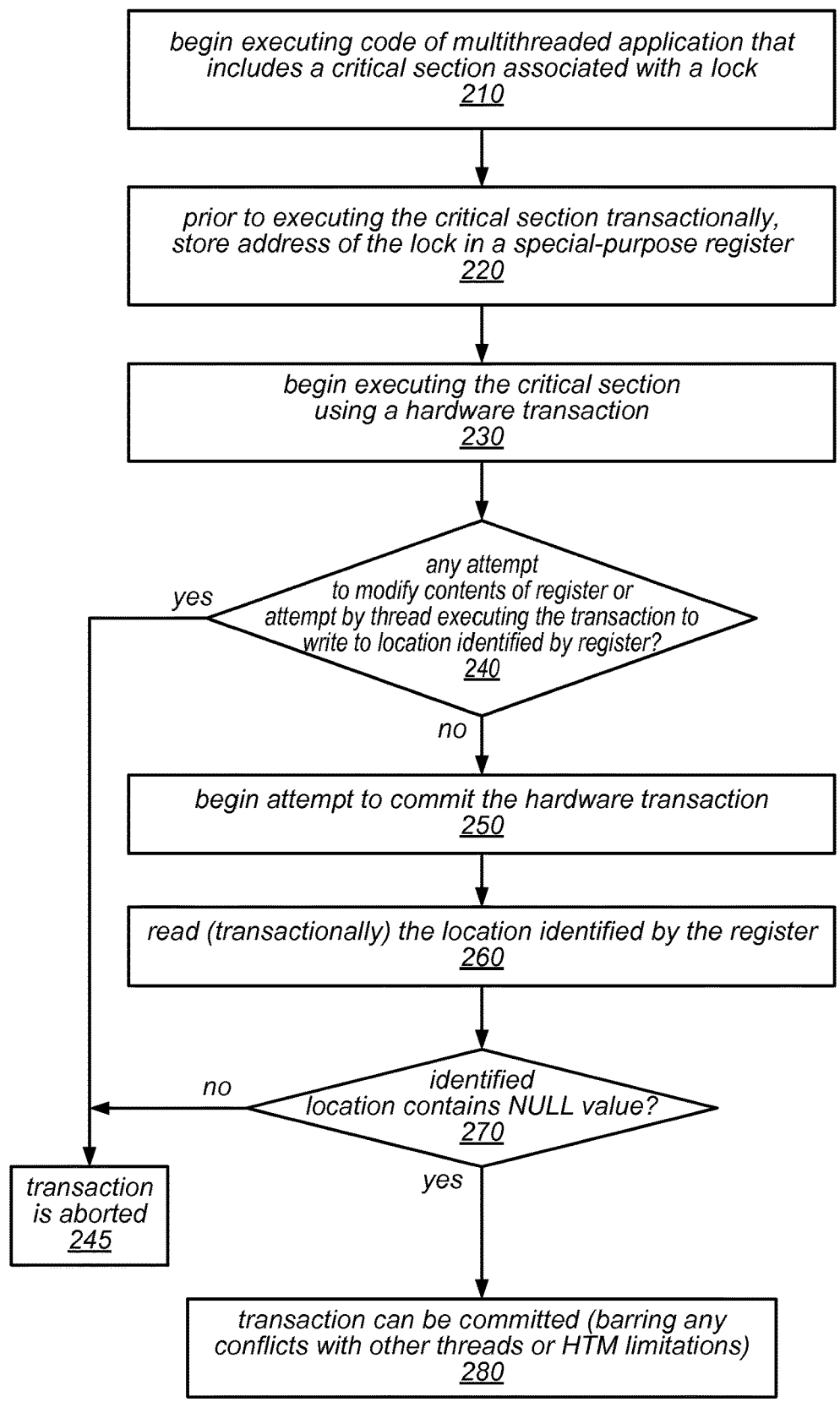
FIG. 2 is a flow diagram illustrating one embodiment of a method for employing a lock address register when implementing lazy subscription.

One embodiment of a method for employing a lock address register when implementing lazy subscription is illustrated by the flow diagram in FIG. 2. As illustrated at 210, in this example, the method may include beginning to execute code of a multithreaded application that includes a critical section associated with a lock. The method may also include, prior to executing the critical section transactionally, storing the address of the lock in a special-purpose register (e.g., a lock address register), as in 220. Once the address of the lock has been stored, the method may include beginning to execute the critical section using a hardware transaction, as in 230.

In this example, if, at any point during execution of the hardware transaction, any attempt is made to modify the contents of the special-purpose register or any attempt is made by the thread executing the transaction to write to the lock location that is identified by the contents of the special-purpose register (shown as the positive exit from 240), the method may include aborting the transaction, as in 245. However, if no such attempts are made during execution of the critical section, shown as the negative exit from 240, the method may include beginning an attempt to commit the hardware transaction, as in 250. This may include reading (transactionally) the location identified by the special-purpose lock address register, as in 260.

As illustrated in this example, if the lock location (e.g., the location identified by the contents of the special-purpose lock address register) does not contain a NULL value (indicating, in this case, that the lock is not available), the method may include aborting the transaction. This is illustrated in FIG. 2 by the path from the negative exit of 270 to 245. However, if the lock location contains a NULL value (indicating, in this case, that the lock is available), the transaction can be committed (barring any conflicts with other threads and subject to limitations of the underlying HTM implementation). This is illustrated in FIG. 2 by the path from the positive exit of 270 to 280.

Limitations of the Basic Approach

In at least some embodiments, the basic approach to safe lazy subscription described above may only support locks that represent the "available" state by storing zero at the address used to identify the lock. In other embodiments, other types of locks may be supported by the addition of another register that is similarly set before the transaction is executed and that is not modifiable during the transaction. In some embodiments, this additional register may store a bitmask to use when checking lock availability. When checking lock availability, such a bitmask may be applied so that only the bit (or bits) of a register associated with a lock that represent lock availability are consulted as part of the availability check. For example, one such register may support sequence locks (seqlocks), which use only a single bit to represent lock availability, while storing additional information in other bits (e.g., the sequence number) in the same register.

In other embodiments, different mechanisms may be employed to support the use of the subscription techniques described herein for other important lock types. For example, in order to determine lock availability for ticket locks, two values may need to be compared to expected values. In another example, in order to determine lock availability for local-spin locks, such as the Craig, Landin, and Hagersten (CLH) queue locks described by Craig, Landin, and Hagersten, a pointer may need to be dereferenced and the pointed-to value tested for availability.

Although, in some embodiments, a conservative approximation of lock availability may suffice to preserve correctness, it may reduce or eliminate the benefit of TLE. For example, some lock types may represent the "available" state as zero until the lock experiences contention, at which point the lock state may be "inflated", requiring a pointer to be dereferenced in order to accurately determine lock availability. In some embodiments, safe lazy subscription schemes, such as the basic approach described above may thereafter always determine that the lock is not available, thus permanently eliminating the benefit of TLE. In other embodiments, the lock may be wrapped with an additional Boolean field that has a non-NULL value while the thread holding the lock is executing in the critical section, and a NULL value while no thread is currently executing in the critical section under the lock. For example, in some embodiments, this Boolean field may be set to a non-NULL value immediately after the lock is acquired, and may be set to a value of NULL immediately before the lock is released. In such embodiments, identifying the lock that is associated with a critical section may include writing (e.g., to a special-purpose register or protected memory location) the location of the Boolean field, and subscribing to the lock may include determining whether or not the lock is "available" by determining the value of the Boolean field (e.g., by reading the contents of the location identified by the stored information).

In some embodiments, arbitrarily complex safe lazy subscription methods may be baked into hardware (e.g., implemented in circuitry within a processor or another component) so that they cannot be modified by critical section code that has observed transient data. However, in other embodiments, it may be preferable to be able to express subscription methods in software, as described in more detail below.

The basic approach to safe lazy subscription described above may also be limited in that it may not fully support lazy subscription for nested critical sections. For example, if the LAR has already been set to ensure lazy subscription of the lock for one critical section, then it may not be possible to achieve lazy subscription of a nested critical section protected by a different lock. In some embodiments, the ideas described above may be extended to support a fixed number of nesting levels by allowing multiple LARs and, if applicable, associated bitmasks and/or subscription methods. Alternatively, the used of protected memory area(s) (e.g., areas specified by base and size registers that are protected as described above) may allow a set of addresses and associated bitmasks and/or subscription methods to be stored, and any attempt to reduce the size of the protected memory area, or to modify locations in it or locations identified by it, may cause a transaction abort. Note that it may be possible that, due to observing transient data, a nested critical section may be configured to use the wrong lock subscription method or to attempt to subscribe to the wrong lock. This may not be a problem, however, because this can happen only as a result of observing transient data protected by the lock associated with an enclosing critical section. This may imply that at least one enclosing critical section was correctly configured to subscribe to the correct lock before the transient data was observed. In this scenario, the nested transaction may be allowed to commit only if all of the nested critical sections successfully subscribe to their locks before committing, and this is guaranteed not to be the case for the (at least one) lock that is correctly subscribed.

Figure 3:
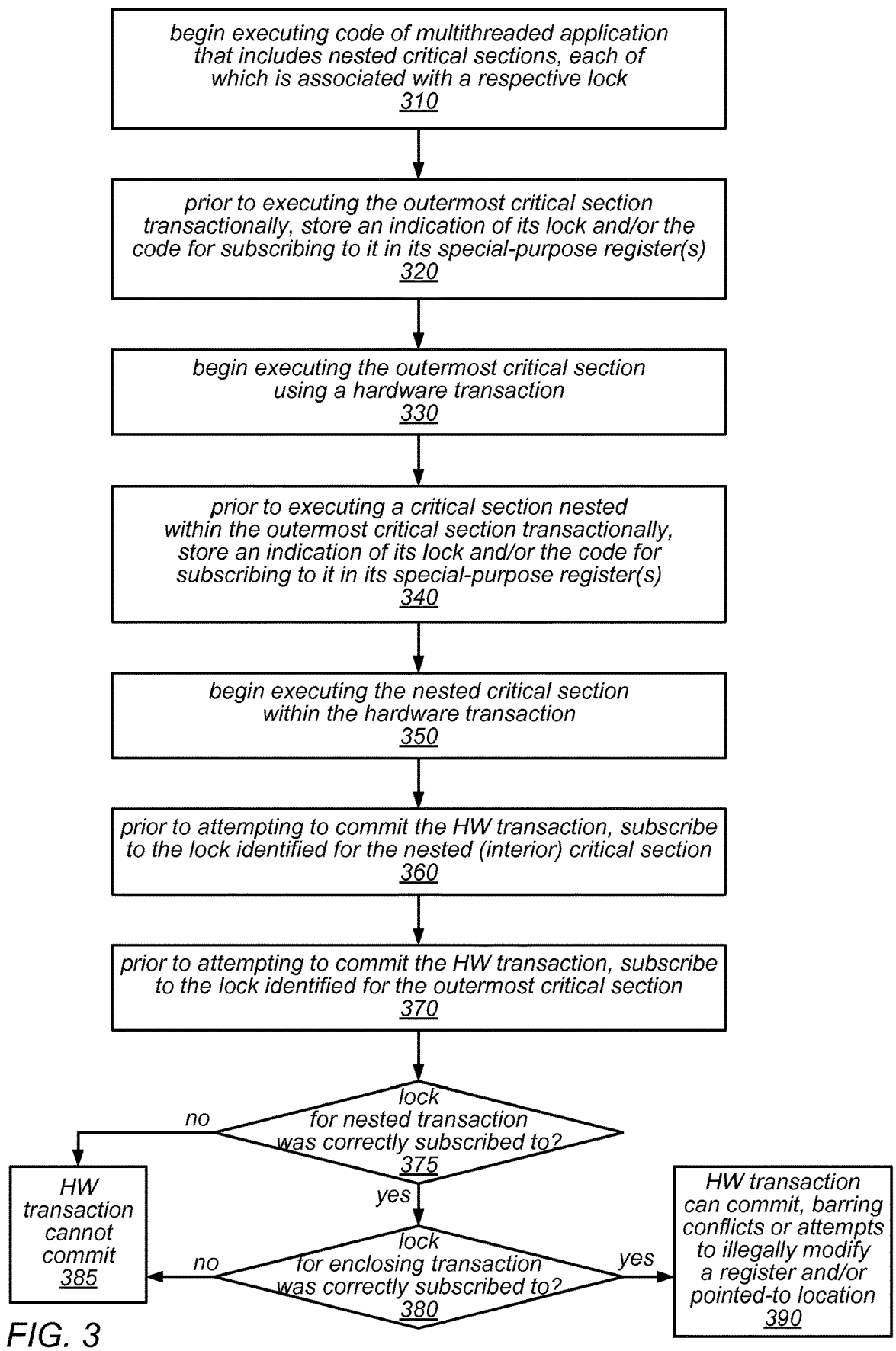
FIG. 3 is a flow diagram illustrating one embodiment of a method for implementing lazy subscription to locks associated with nested critical sections.

One embodiment of a method for implementing lazy subscription to locks associated with nested critical sections is illustrated by the flow diagram in FIG. 3. As illustrated at 310, in this example, the method may include beginning to execute code of a multithreaded application that includes nested critical sections, each of which is associated with a respective lock. The method may include, prior to executing the outermost critical section transactionally, storing an indication of its lock and/or the code for subscribing to its lock in one or more special-purpose registers, as in 320. Once these indications have been stored, the method may include beginning to execute the outermost critical section using a hardware transaction, as in 330.

As illustrated in this example, the method may include, prior to executing a critical section nested within the outermost critical section transactionally, storing an indication of its lock and/or the code for subscribing to its lock in one or more special-purpose registers, as in 340. Once these indications have been stored, the method may include beginning to execute the nested critical section within the hardware transaction, as in 350. The method may also include, prior to attempting to commit the hardware transaction, subscribing (or at least attempting to subscribe) to the lock that was identified for the nested (interior) critical section, as in 360. Similarly, the method may include, prior to attempting to commit the hardware transaction, subscribing (or at least attempting to subscribe) to the lock that was identified for the enclosing (outermost) critical section, as in 370.

In this example, if the lock for the nested critical section (i.e., the interior critical section) was not correctly subscribed to (shown as the negative exit from 375) and/or if the lock for the outermost (enclosing) critical section was not correctly subscribed to (shown as the negative exit from 380), the hardware transaction cannot commit, as in 385. However, if both the lock for nested (interior) critical section and the lock for the enclosing critical section were correctly subscribed to, shown as the positive exit from 375 and the positive exit from 380, the hardware transaction may be allowed to commit, barring conflicts or attempts to illegally modify a register and/or pointed-to location (and subject to limitations of the underlying HTM implementation), as in 390. Note that while FIG. 3 illustrates an example in which there are only two nesting levels, in other embodiments, a similar approach may be applied to implement lazy subscription to locks associated with more than two nested critical sections. In such embodiments, either the hardware transaction executing the nested critical sections will be successfully committed or none of the critical sections will take effect.

Note that, in various embodiments, it may or may not be necessary to subscribe to the lock associated with the nested (interior) critical before completing execution of the outermost (enclosing) critical section. Note also that, in other embodiments, the underlying HTM implementation may support the use of nested transactions for executing nested critical sections. In some such embodiments, each of the critical sections (e.g., an interior critical section and an enclosing critical section) may be executed by a respective hardware transaction, but neither transaction can commit unless the locks associated with both of the critical sections (e.g., locks whose locations were identified by respective special-purpose registers) have been correctly subscribed to (e.g., using subscription code whose locations were identified by respective special-purpose registers).

More Flexible Approaches

In some embodiments, in order to support arbitrary lock types, another register may be added, and this register (which may implemented in circuitry within a processor or another component) may be managed and protected against corruption in a manner similar to that applied to the LAR discussed above. In such embodiments, the value stored in this subscription code address register (SCAR) may identify the code for subscribing to the lock identified by the corresponding LAR (e.g., it may be used to record the starting address of subscription code). In some embodiments, in order to support the nesting of different lock types that require different subscription code, techniques similar to those described above for managing nested locks may be used to record the respective address for the appropriate subscription code for each lock in a different SCAR. In some embodiments, a modification of (or an attempt to modify) the SCAR (or the subscription code at the located identified by the SCAR) may cause the transaction to abort. As described below, in some embodiments, in order to detect changes to the subscription code and/or to the lock state, the thread that is to subscribe to the lock may be configured to enter a special mode (before executing the subscription code) that disallows the execution of code in the transaction's write set or the reading of data in the transaction's write set. In other words, rather than configuring the system so that a modification of the SCAR (or subscription code) causes the transaction to abort, the system may be configured so that the subscription code and/or the SCAR, once written to, cannot be modified. In still other embodiments, rather than using a special-purpose register to hold the subscription code address information, this information may be stored in a location in a protected memory area (e.g., one that cannot be modified, or one whose modification would cause the transaction to abort). Note that, in embodiments that include both a LAR and a SCAR, the system may ensure that, for each of these registers, either the register cannot be modified or any attempt to modify the register causes the transaction to abort. However, the two registers need not necessarily implement the same mechanism. For example, one of the registers may be configured so that it cannot be modified, while the other may be configured so that any attempt to modify the register causes the transaction to abort.

Figure 4:
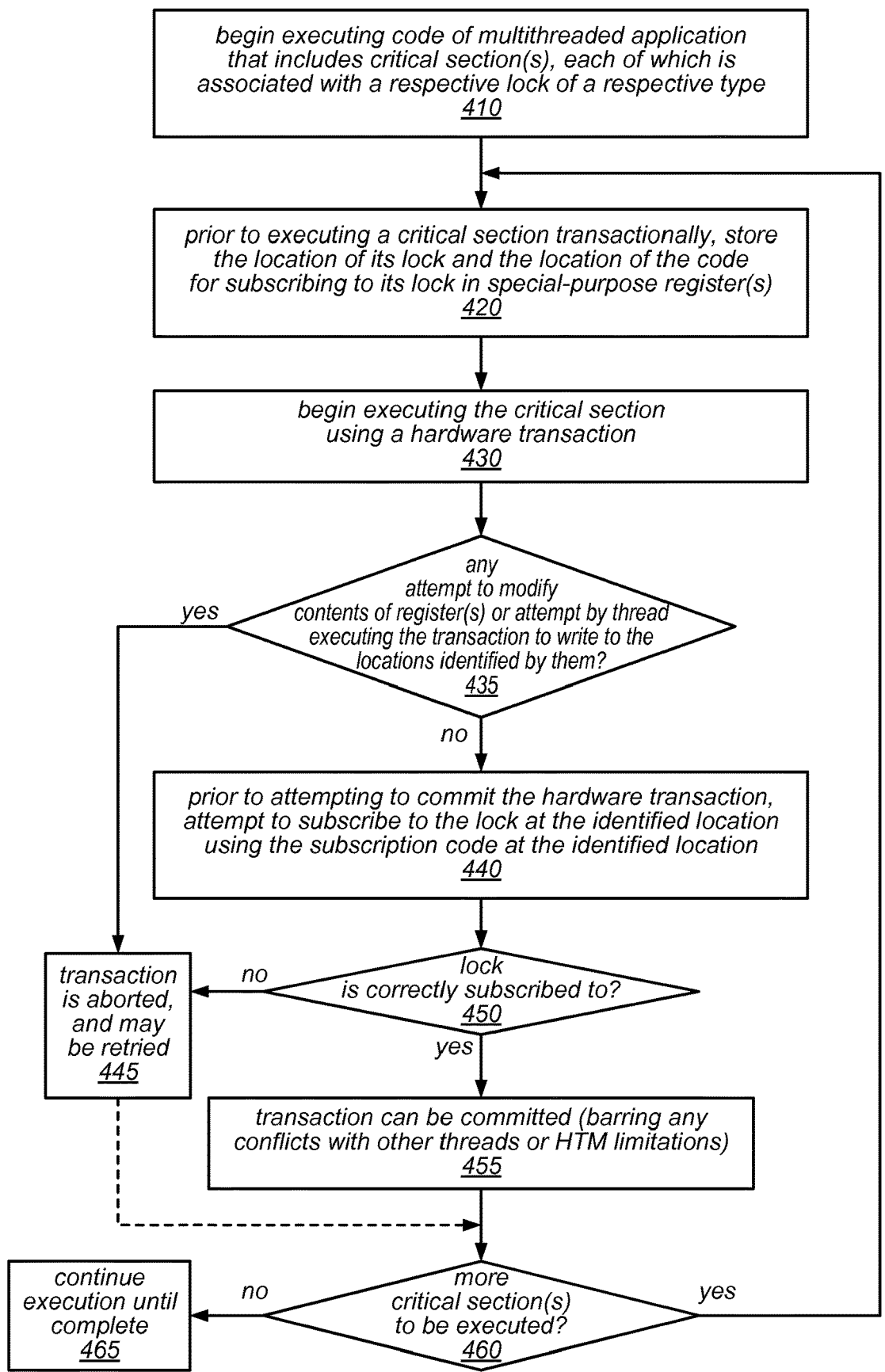
FIG. 4 is a flow diagram illustrating one embodiment of a method for employing a subscription code address register when implementing lazy subscription for one of various types of locks.

One embodiment of a method for employing a subscription code address register when implementing lazy subscription for one of various types of locks is illustrated by the flow diagram in FIG. 4. As illustrated at 410, in this example, the method may include beginning to execute code of a multithreaded application that includes one or more critical sections, each of which is associated with a respective lock of a respective lock type. In some embodiments, all of the locks associated with the critical sections may be of the same lock type (e.g., one of multiple lock types supported in the system on which the multithreaded application is running), while in other embodiments, at least some of the locks associated with the critical sections may be of different lock types. The method may include, prior to executing one of the critical sections transactionally, storing the location of its lock and the location of the code for subscribing to its lock in one or more special-purpose registers of (or associated with) a thread that will be executing the critical section, as in 420. In some embodiments, the location of the lock and the location of the code for subscribing to the lock (e.g., the locations at which the lock and/or the subscription code reside in a hardware transactional memory) may be stored in different special-purpose registers, while in other embodiments, they may be stored in two fields (or portions) of a single special-purpose register.

As illustrated in this example, the method may include a given thread beginning to execute the critical section using a hardware transaction, as in 430. If, at any point during execution of the hardware transaction, any attempt is made to modify the contents of one or more special-purpose register(s) that are associated with the thread, the critical section, or the lock, or if any attempt is made by the thread executing the transaction to write to the locations identified by the special-purpose register(s) (shown as the positive exit from 435), the transaction may be aborted, and may (in some embodiments) be retried, as in 445. However, if no such attempts are made during execution of the critical section (shown as the negative exit from 435), the method may include, prior to attempting to commit the hardware transaction, attempting to subscribe to the lock at the identified location (e.g., the lock at the location pointed to by the contents of the special-purpose register) using the subscription code at the identified location (e.g., the subscription code beginning at the location pointed to by the special-purpose register), as 440. In various embodiments, and depending on the lock type, executing the subscription code may include reading (transactionally) one or more locations associated with the lock, dereferencing a pointer, applying a bitmask, comparing a lock state with an expected value, or performing other actions usable in determining whether the lock is available.

In this example, if the identified lock is not correctly subscribed to (shown as the negative exit from 450), the method may include aborting the transaction, which may, in some cases, be retried (as in 445). On the other hand, if the lock is correctly subscribed to (shown as the positive exit from 450), the method may include allowing the transaction to be committed (barring any conflicts with other threads or HTM limitations), as in 455.

In this example, while there are more critical sections to be executed (or critical sections to retry following the failure of a hardware transaction, shown by the dashed path from 445 to 460), the method may include repeating some or all of the operations illustrated in 420-455, as appropriate. This is illustrated in FIG. 4 by the feedback from the positive exit of 460 to 420. If, or once, there are no additional critical sections to be executed (shown as the negative exit from 460), the method may include continuing execution of the multithreaded application to its completion, as in 465.

Note that, in some embodiments, the operations illustrated in FIG. 4 may be performed by (or on behalf of) multiple threads at the same time, each of which encounters one or more critical sections associated with a respective lock. Note also that, in this and other examples described herein, if a hardware transaction executing a critical section using a safe lazy subscription approach to TLE fails or aborts (e.g., one or more times, up to a predetermined maximum number of times), the thread executing the critical section may revert to a default approach in which the thread acquires the lock associated with the critical section and executes it without using a hardware transaction (as originally programmed).

In some embodiments of the systems described herein, in order to ensure correct subscription, the system may be configured to ensure that the critical section cannot overwrite the subscription code and that it cannot modify data that the subscription code reads. For example, the latter condition may be necessary to avoid the lock scribbling pitfall. On the surface, this may seem especially challenging because the hardware cannot predict which code will be executed when the function identified by the SCAR is invoked, nor what data it will access. However, it may not be necessary to abort a transaction as soon as it writes to the lock contents or the subscription code. Instead, the system may be configured to ensure only that the transaction does not commit successfully without first correctly subscribing to the lock. Thus, attempts to overwrite lock data or subscription code may not need to be detected until the subscription method attempts to execute the modified code or to read the modified lock data.

In some embodiments, in order to support flexible, software-defined lock subscription, a transaction may enter a special mode immediately before starting to execute the subscription code in which, if the transaction attempts to execute code or to read data that is in the transaction's write set, the transaction aborts and does not take effect. Because HTM implementations must generally detect cases in which a transaction reads data it has written, supporting this behavior may not add significant additional complexity to an HTM design.

Figure 5:
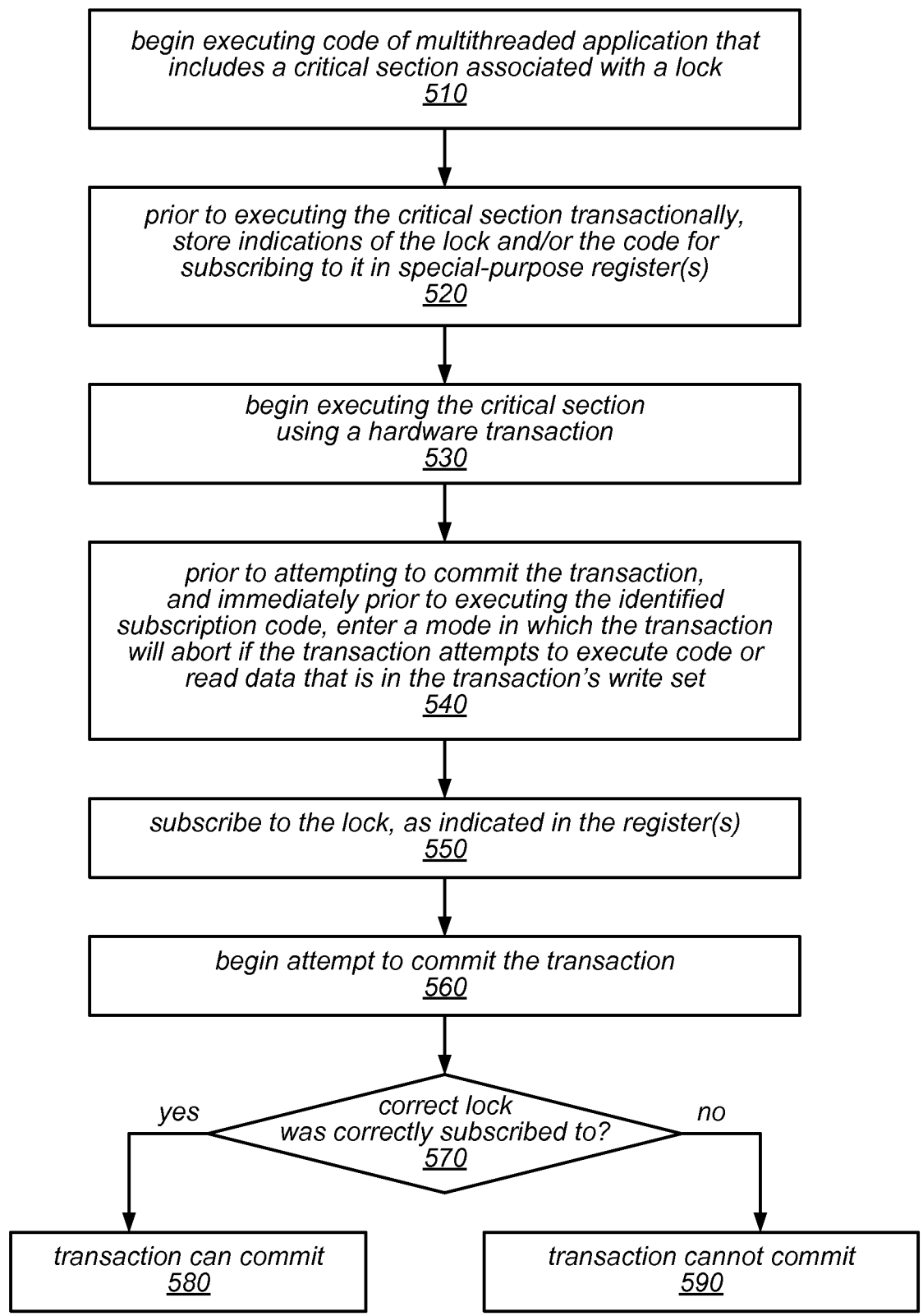
FIG. 5 is a flow diagram illustrating one embodiment of a method for implementing a lazy subscription to a lock that includes entering a special mode immediately before executing its subscription code.

One embodiment of a method for safely implementing a lazy subscription to a lock that includes entering such a mode is illustrated by the flow diagram in FIG. 5. As illustrated in this example, the method may include beginning to execute the code of a multithreaded application that includes a critical section associated with a lock (as in 510). The method may also include, prior to executing the critical section transactionally, storing indications of the lock and/or the code for subscribing to the lock in one or more special-purpose registers (as in 520). Once these indications have been stored, the method may include beginning to execute the critical section using a hardware transaction (as in 530).

In the example, the method may include, prior to attempting to commit the transaction, and immediately prior to executing the identified subscription code, entering a mode in which the transaction will abort if the transaction attempts to execute code or read data that is in the transaction's write set (as in 540). Once in this mode, the method may include subscribing to the identified lock, which may include attempting to subscribe to the lock by executing the subscription code that is indicated in the special-purpose register(s) (as in 550), and beginning an attempt to commit the transaction (as in 560).

In this example, if the correct lock was correctly subscribed to (shown as the positive exit from 570), the transaction may be able to commit (as in 580), assuming it is not aborted due to a read or write conflict of the transaction. Otherwise (e.g., if the wrong lock is subscribed to or the wrong subscription code is executed due to one or both of the registers being overwritten), the transaction cannot commit (e.g., the transaction may be prevented from committing), as in 590, regardless of whether the transaction itself encounters a read or write conflict.

Note that, while transactions may conceivably be used to simplify techniques based on self-modifying code by ensuring sets of changes take effect atomically, it is believed that the benefits (if any) of being able to modify and execute code within the same transaction are outweighed by the likelihood of such questionable practices resulting in incorrect behavior. Therefore, in some embodiments, the systems described herein may be configured to prevent transactions from executing code that they have modified, independent of the lazy subscription technique being applied. In contrast, aborting a transaction because it reads data that it has written does not make sense, in general. Therefore, this behavior may be limited to the execution of lazy subscription code.

Note that a potential disadvantage of the techniques described herein may, in some embodiments, be that a transaction may be caused to abort unnecessarily if it modifies data that is near the lock, but is not actually part of the lock. This may happen, for example, if the lock is co-located with data it protects, such as in the same cache line (if this is the granularity at which a transaction's write set is tracked). In such embodiments, this may not compromise correctness, however, but may only be a performance issue, albeit a potentially significant one. In some embodiments, this issue may be mitigated, at the expense of additional hardware cost and complexity, by maintaining state for each cache line modified by a transaction that records at finer granularity (per word, for example) which parts of the cache line have actually been modified by the transaction. Doing so may allow the subscription method to avoid aborting a transaction that has modified data in the same cache line as some data read by the subscription method, even though it has not modified any data actually read by the subscription method.

Further Extensions

Note that the purpose of the lazy subscription technique may, in general, be to reduce the window in which a transactionally-executed critical section is vulnerable to abort due to the lock being held or acquired. It has been observed that, if a transaction determines that the lock is held when it performs this subscription, it is immediately doomed to abort and retry. In some embodiments, this scenario may be mitigated by techniques that allow a transaction to wait for a variable to change value before attempting to subscribe to the lock. In such embodiments, the transaction may be less likely to abort (and to need to be retried) due to the lock being held when the subscription is performed.

In one example, if the HTM supports non-transactional loads, then in some cases, it may be possible to use such loads to wait for the lock to become available before subscribing to the lock. In such embodiments, the waiting may not compromise the correctness of the subscription, because the lock would ultimately be subscribed to transactionally before committing the transaction. In a more specific example, if the lock is implemented as a single word representing "available" and "locked" states, the subscription method may repeatedly read the word using non-transactional loads until the lock state is "available". Once the lock is available, the subscription method may read the lock word transactionally, as in previous examples, and may subsequently confirm that it is available before committing the transaction.

Figure 6:
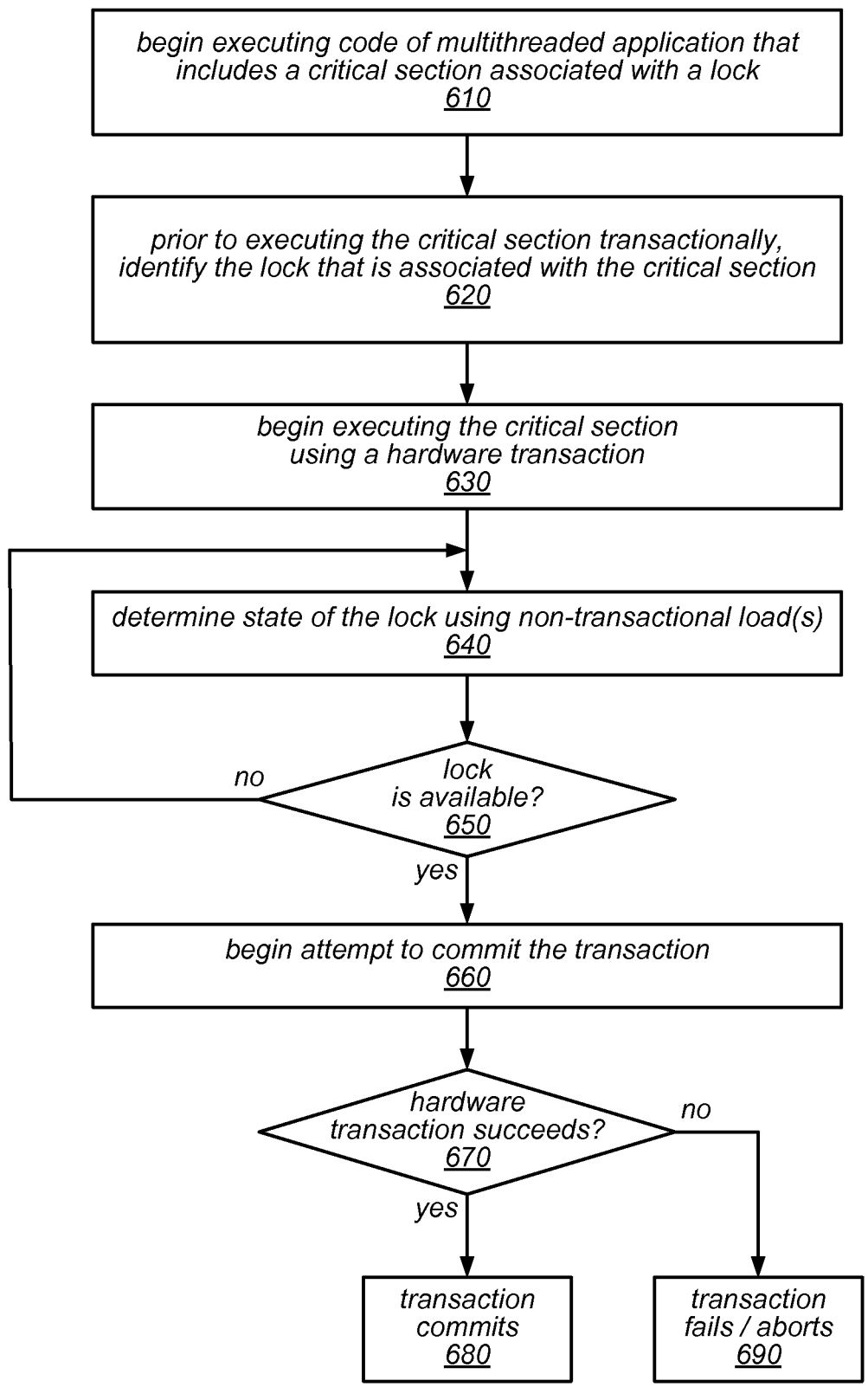
FIG. 6 is a flow diagram illustrating one embodiment of a method for employing non-transactional stores when implementing a lazy subscription to a lock.

One embodiment of a method for employing non-transactional loads when implementing a lazy subscription to a lock is illustrated by the flow diagram in FIG. 6. As illustrated at 610, in this example, the method may include beginning to execute code of a multithreaded application that includes a critical section associated with a lock. The method may include, prior to executing the critical section transactionally, identifying the lock that is associated with the critical section, as in 620. As described herein, in some embodiments, identifying the lock may include storing an identifier or location of the lock (e.g., the location at which the lock resides in hardware transactional memory) in a special-purpose register. Once the correct lock has been identified, the method may include beginning to execute the critical section using a hardware transaction, as in 630.

In this example, the method may include (within the hardware transaction) determining the state of the lock using one or more non-transactional loads, as in 640. If the lock is not available, the method may include waiting for the lock to become available before proceeding. This is illustrated by the feedback from the negative exit of 650 to 640. In other words, in some embodiments, the method may include repeatedly reading the state of the lock (non-transactionally) until the lock is available. If, or once, the lock is available (shown as the positive exit from 650), the method may include beginning an attempt to commit the transaction, as in 660.

If the hardware transaction succeeds (shown as the positive exit from 670) the method may include committing the transaction, as in 680. Otherwise (shown as the negative exit from 670), the transaction may fail or may otherwise be aborted, as in 690. Again note that, in some embodiments, if a hardware transaction executing a critical section using a safe lazy subscription approach to TLE fails or aborts (e.g., one or more times, up to a predetermined maximum number of times), the thread executing the critical section may revert to a default approach in which the thread acquires the lock associated with the critical section and executes it without using a hardware transaction (as originally programmed).

In various embodiments, the effectiveness of this approach to safe lazy subscription described herein may depend on the availability of hardware features on the relevant platform to support waiting until a variable's value changes without aborting a transaction. A range of possibilities exists for enhancing such support. For example, in some embodiments, the performance and/or overhead of this waiting may be improved through the use of special instructions that wait for coherence events (such as the invalidation of a lock that is held, indicating it is likely to have been released).

Independent of any particular lazy subscription technique, discussions of the use of non-transactional memory operations within hardware transactions raise some important observations. For example, if an HTM implementation supports non-transactional stores (or any kind of side effect that may affect program semantics when executed in a transaction that aborts), then care may need to be taken not to use such instructions within critical sections to be used with TLE. The reason is that, if an attempt to execute such a critical section in a hardware transaction using TLE fails, then the store may take effect even though the critical section has not been executed yet. This may result in program behavior that would not be possible if critical sections were always executed while holding the lock, breaking the TLE technique. For example, some implementations of eager subscription techniques may ensure that a non-transactional store executes only when the transaction (up to that point) represents a consistent view of memory including the location(s) of the lock(s) that have been subscribed to.

Some implementations of lazy subscription techniques may require additional care because the lock has not been subscribed to at the time at which the store is made. Furthermore, some implementations of non-transactional stores may not maintain the stored-to location as part of a transaction's write set, and hence may permit updates to the lock (or subscription code) without detection. While it may seem that such non-transactional store instructions would generally be used only in code that is intended to be explicitly used in transactions, it may be possible, in some scenarios, that some code intended for use in hardware transactions may also be called in critical sections protected by a lock, in which case using TLE to elide such critical sections may change the program semantics. In order to address this potential issue, some embodiments of the systems described herein may be configured to support a transaction execution mode that insists that all store instructions (even non-transactional ones) are executed transactionally, and such a mode may be used for TLE. In the absence of such protection, any non-transactional store feature may need to be used with care to ensure this scenario does not occur.

Concluding Remarks

A number of ways in which the "lazy subscription" optimization for Transactional Lock Elision (TLE) (in which lock subscription is delayed until the end of transactional critical section execution in order to reduce the transaction's window of vulnerability to abort) is not safe for use with existing hardware transactional memory (HTM) features have been described. For example, in some cases, a transaction may observe inconsistent data if it does not subscribe to the lock early, and as a result may fail to correctly subscribe to the lock before committing.

The systems and techniques described herein for performing safe lazy subscription may overcome the pitfalls described above, without losing the benefits of TLE. Experiments using these techniques have been performed in carefully controlled benchmarks. Preliminary results indicate that safe lazy subscription is worth pursuing further, as it appears to yield significant performance benefits without compromising correctness, in at least some cases.

The hardware extensions described herein may eliminate these issues entirely in hardware, allowing lazy subscription to be safely used with TLE and SGL-based transaction systems with no special compiler support or manual analysis. It is believed that, in many embodiments, such extensions are likely to add only modest cost and complexity to an HTM design.

Figure 7:
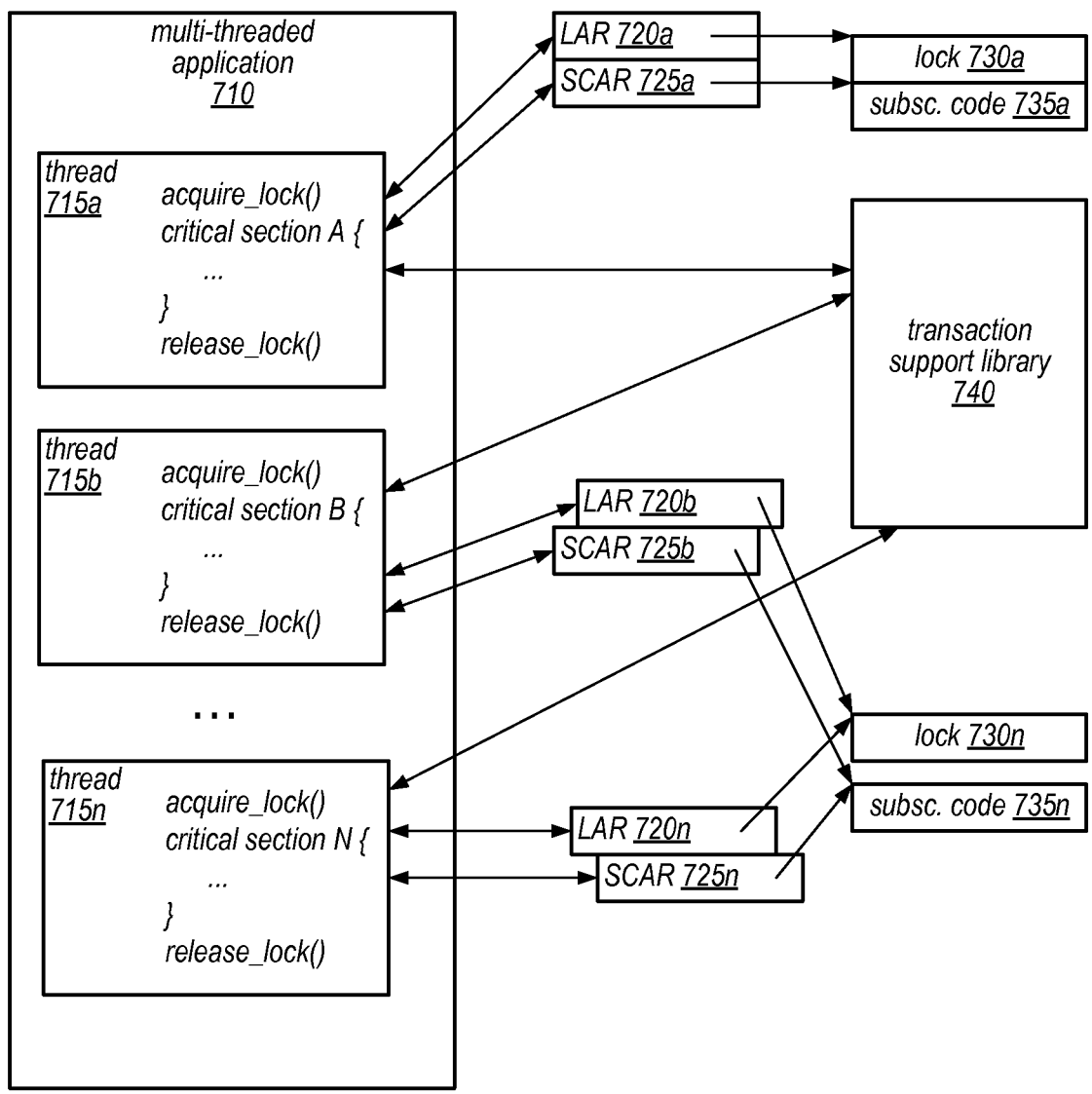
FIG. 7 is a block diagram illustrating interactions between components of a system that is configured to implement safely subscribing to locks using hardware extensions, according to at least some embodiments

FIG. 7 is a block diagram illustrating interactions between components of a system that is configured to implement safely subscribing to locks using hardware extensions, according to at least some embodiments. As illustrated in this example, the system may include a multithreaded application 710 that is executed by at least threads 715a-715n, each of which includes a critical section associated with a lock. More specifically, each thread (threads 715a-715n, in this example) may execute one or more critical sections (which may or may not be nested), each of which is associated with a respective lock, lock address register (LAR), and subscription code address register (SCAR).

As illustrated in this example, the LARs accessed by different threads may point to the same locks or to different locks. For example, thread 715a includes a critical section A that is associated with a lock 730a. The location of lock 730a is identified by the contents of LAR 720a, which is associated with and/or read by thread 715a to determine the lock to be subscribed to in order to execute critical section A. Similarly, the SCARs accessed by different threads may point to the same subscription code or to different subscription code, depending on the types of the locks associated with the different threads. For example, the subscription code 735a for subscribing to lock 730a is identified by the contents of SCAR 725a, which is associated with and/or read by thread 715a in order to locate the code to be executed to subscribe to the lock 730a.

In the example illustrated in FIG. 7, thread 715n includes a critical section N that is associated with a lock 730n. The location of lock 730n is identified by the contents of LAR 720n, which is associated with and/or read by thread 715n to determine the lock to be subscribed to in order to execute critical section N. In this example, the subscription code 735n for subscribing to lock 730n is identified by the contents of SCAR 725n, which is associated with and/or read by thread 715n in order to locate the code to be executed to subscribe to the lock 730n. In this example, critical section B (executed by thread 715b) and critical section N (executed by thread 715n) are protected by the same lock (lock 730a) but each is associated with its own LAR and SCAR. For example, thread 715b includes a critical section B that is also associated with a lock 730n. The location of lock 730n is identified by the contents of LAR 720b, which is associated with and/or read by thread 715b to determine the lock to be subscribed to in order to execute critical section B. In this example, the subscription code 735n for subscribing to lock 730n is identified by the contents of SCAR 725b, which is associated with and/or read by thread 715b in order to locate the code to be executed to subscribe to the lock 730n. In this example, critical section A is protected by a different lock than that which protects critical section B and critical section N.

As illustrated in FIG. 7, the system may include a transaction support library 740, which may include the acquire_lock( ) and release_lock( ) routines called by threads 715a-715n. In some embodiments, the acquire_lock( ) routine provided by transaction support library 740 may be configured to attempt to perform TLE using the techniques described herein for safely implementing lazy subscription and/or to acquire the locks associated with the critical sections executed by threads 715a-715n if an attempt to perform TLE fails (e.g., if the correct locks are not correctly subscribed to or if the hardware transactions invoked by the acquire_lock( ) routines cannot commit for any reason).

In some embodiments, in order to implement safe lazy subscription, rather than determining whether or not a lock is held, it may be sufficient to know whether or not a critical section that is protected by the lock is currently being executed. In some such embodiments, and as described above, a Boolean may be added to each lock (e.g., a flag indicating whether or not there is any thread currently executing in the critical section). In this example, after acquiring the lock, but prior to executing the critical section, a thread may set the Boolean to True (e.g., to a non-NULL value, which representing a True condition), and before releasing the lock, the thread may set the Boolean to False (e.g., to a NULL value, which represents a False condition). In such an embodiment, a thread may not need to subscribe to the lock itself in order to ensure correct behavior, but may only need to subscribe to the Boolean. Note that embodiments that implement this approach may employ special-purpose lock address registers (LARs), such as those described herein, but may avoid the additional complexity of the special-purpose subscription code address registers (SCARs) and/or other mechanisms for making lazy subscription safe that are described above.

While various techniques for making lazy subscription to a lock safe are described herein primarily in terms of their application to systems that implement hardware transactional memory (HTM), in other embodiments, these techniques may also be applied in software transactional memory (STM) or hybrid transactional memory (HyTM) settings. For example, in some embodiments, a system that implements HyTM may apply TLE over a single lock, and may use the techniques described herein to perform safe lazy subscription to that lock. In other embodiments, the techniques described herein may be applied in more sophisticated HyTM systems. In some embodiments, these techniques may be more broadly applicable for use with concurrent programs other than lock-based programs. In some embodiments, they may be applicable in situations in which the "locks" and "critical sections" implemented in the programs are not necessarily expressed at the source code level by a programmer, but may be a result of some program transformation. For example, a program that includes transactions at the programming language level may be translated (e.g., by a compiler) into code that uses "locks" to protect "critical sections". As described herein, these "locks" may come in any of a variety of flavors and have various methods for subscription. In still other embodiments, there may be a way to use hardware transactions that are not required to subscribe to a lock (since, e.g., not all uses of HTM involve TLE and not all TLE implementations use lazy subscription). For example, in some embodiments, there may be variants of the "begin transaction" (or "begin_tx") instruction that indicate whether subscription is required at commit time or not.

Computing System Example

Figure 8:
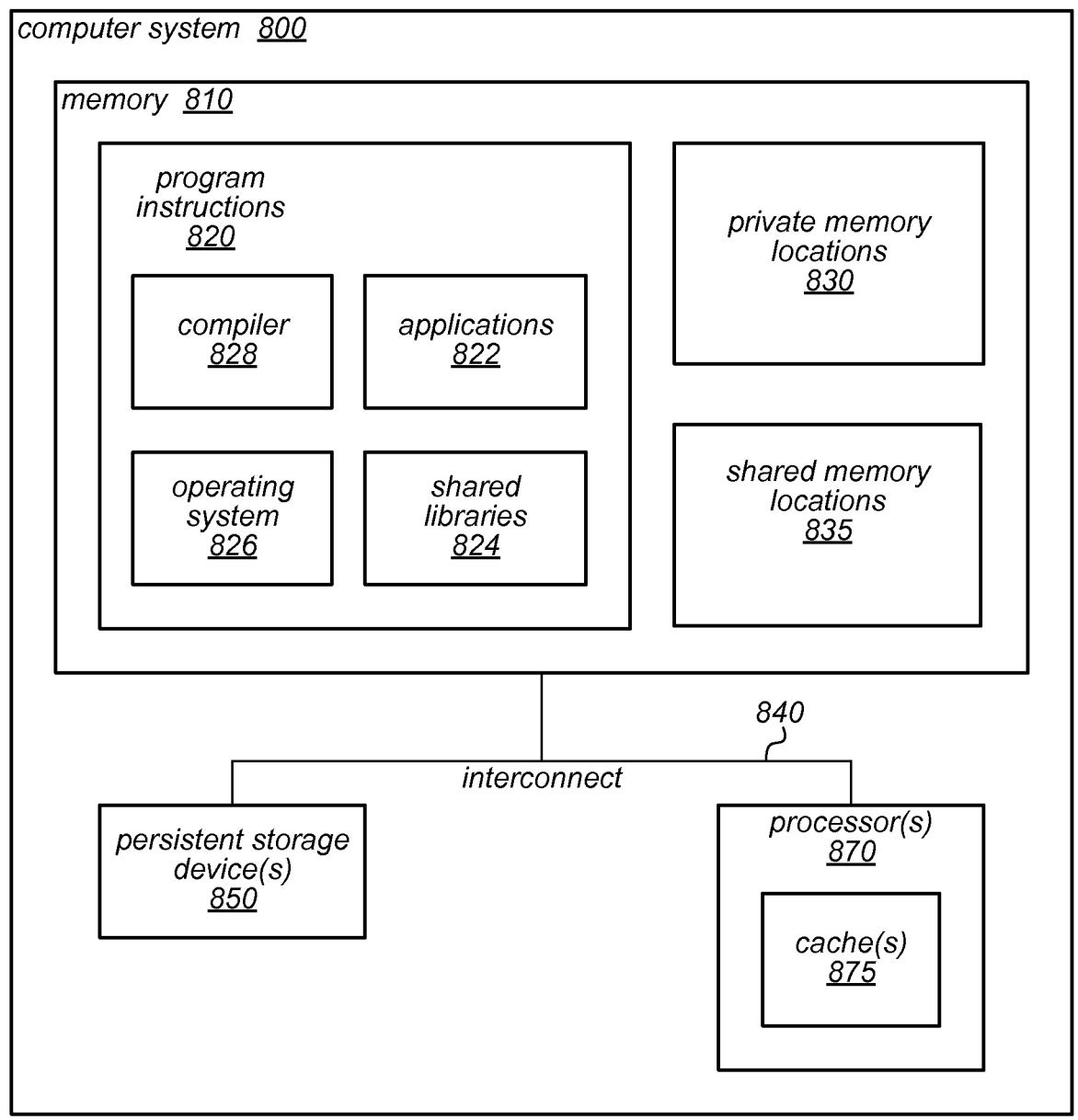
FIG. 8 is a block diagram illustrating a computing system configured to implement one or more of the disclosed techniques, according to various embodiments.

The systems and methods described herein for implementing safe lazy subscription to a lock may be implemented on or by any of a variety of computing systems, in different embodiments. FIG. 8 illustrates a computing system 800 that is configured to implement the disclosed techniques, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing the techniques described herein, may be provided as a computer program product, or software, that may include a non-transitory, computer-readable storage medium having stored thereon instructions, which may be used to program a computer system 800 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

In various embodiments, computer system 800 may include one or more processors 870; each may include multiple cores, any of which may be single or multi-threaded. For example, multiple processor cores may be included in a single processor chip (e.g., a single processor 870), and multiple processor chips may be included in computer system 800. Each of the processors 870 may include a cache or a hierarchy of caches 875, in various embodiments. For example, each processor chip 870 may include multiple L1 caches (e.g., one per processor core) and one or more other caches (which may be shared by the processor cores on a single processor). In some embodiments, each processor chip or hardware execution context (thread) thereof may include (or be associated with) a set of registers or protected memory locations, which may include registers or protected memory locations for storing identifiers or addresses of a lock and/or its subscription code (e.g., register or protected memory locations that implement the functionality of the lock address register, LAR, and/or the subscription code address register, SCAR, described herein). The computer system 800 may also include one or more persistent storage devices 850 (e.g. optical storage, magnetic storage, hard drive, tape drive, solid state memory, etc) and one or more system memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.).

The one or more processors 870, the storage device(s) 850, and the system memory 810 may be coupled to the system interconnect 840. One or more of the system memories 810 may contain program instructions 820. Program instructions 820 may be executable to implement one or more applications 822 (which may include original or modified application source code and/or executable application code that includes one or more accesses to a critical section of code or shared resource that may be protected by lock, as described herein), shared libraries 824 (which may include a library that supports transactional memory, or a library containing subscription code for one or more types of locks), or operating systems 826. In some embodiments, program instructions 820 may include a compiler 828. In some embodiments, compiler 828 may be an optimizing compiler that is configured to apply one or more transformations and/or optimizations to application or library code that is executable to implement the disclosed techniques. In some embodiments, program instructions 820 may be executable to implement a contention manager (not shown). In some embodiments, program instructions 820 may also be configured to implement a transaction support library, which provides various methods for implementing atomic transactions using hardware transactional memory (HTM), software transactional memory (STM) or hybrid transactional memories (e.g., within shared libraries 824 or elsewhere within program instructions 820). In some embodiments, a transaction support library may include functionality to execute transactions according to various hardware and/or software transactional memory techniques. For example, in some embodiments, applications 822 may make calls into a transaction support library for beginning and ending (i.e., committing) transactions, for acquiring and/or releasing locks (which may apply the safe lazy subscription techniques described herein to support TLE), and/or for performing one or more accesses to shared memory locations 835 (e.g., locations within a shared transactional memory space) from within transactions, and/or other calls into a library to support any or all of the techniques described herein.

Program instructions 820 may be encoded in platform native binary, any interpreted language such as Java™ byte-code, or in any other language such as C/C++, Java™, etc or in any combination thereof. In various embodiments, compiler 828, applications 822, operating system 826, and/or shared libraries 824 may each be implemented in any of various programming languages or methods. For example, in one embodiment, compiler 828 and operating system 826 may be JAVA based, while in another embodiment they may be written using the C or C++ programming languages. Similarly, applications 822 may be written using Java, C, C++, or another programming language, according to various embodiments. Moreover, in some embodiments, compiler 828, applications 822, operating system 826, and/or shared libraries 824 may not be implemented using the same programming language. For example, applications 822 may be C++ based, while compiler 828 may be developed using C.

The program instructions 820 may include transactional memory support, operations, or procedures, and/or other processes for implementing the techniques described herein. Such support and functions may exist in one or more of the shared libraries 824, operating systems 826, or applications 822, in various embodiments. The system memory 810 may further comprise private memory locations 830 and/or shared memory locations 835 where data may be stored (e.g., lock state information, lock address information, subscription code address information, configuration parameters such as a maximum hardware transaction retry limit, or other data usable in implementing safe lazy subscription). For example, shared memory locations 835 may include locations in a shared transactional memory space, which may support and/or be accessed by transactions in a software transactional memory implementation, a hardware transactional memory implementation, and/or a hardware-software hybrid transactional memory implementation, in different embodiments. In some embodiments, shared memory locations 835 may store data or other shared resources (e.g., lock data structures, including metadata, counters, or scalable nonzero indicators (SNZI) indicators, and/or data structures or other shared resources that are protected by a lock) that are accessible to multiple, concurrently executing threads, processes, or transactions, and that may be protected by one or more locks, in various embodiments. In addition, the system memory 810 and/or any of the caches of processor(s) 870 may, at various times, store recorded values of data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of lock structures, policies, and particular procedures, it should be noted that the techniques and mechanisms disclosed herein may be applicable in other contexts in which critical sections of code and/or shared resources may be protected by other types of locks/structures under different policies or procedures than those described in the examples herein. It is intended that the following claims be interpreted to embrace all such variations and modifications.

What is claimed:

1. A system, comprising:
   one or more processor cores;
   a hardware transactional memory; and
   a memory coupled to the one or more processor cores and storing program instructions that when executed on the one or more processor cores cause the one or more processor cores to execute a multithreaded application that comprises a critical section, wherein the critical section is associated with a lock;
   wherein to execute the multithreaded application, the one or more processor cores are configured to:
      begin execution of the multithreaded application;
      store, prior to executing the critical section by a thread of one of the one or more processor cores:
         information identifying the lock that is associated with the critical section in a lock address register, wherein the information identifies the location at which the lock associated with the critical section resides in the hardware transactional memory;
         information identifying a location of subscription code in a code address location, wherein the subscription code comprises program instructions executable to attempt to subscribe to the identified lock; and
      begin execution, by the thread, of the critical section using a hardware transaction; and
   wherein the one of the one or more processor cores is configured to commit the hardware transaction conditioned on determining that the lock address register, the code address location, the subscription code and the identified lock have not been modified during execution of the hardware transaction.

2. The system of claim 1,
   wherein, in response to encountering, during execution of the critical section using the hardware transaction, an instruction that signals an end of the critical section, the thread is further configured to:
      attempt, within the hardware transaction, to subscribe to the lock identified by the stored information, wherein successfully subscribing to the identified lock comprises determining that the identified lock is currently available;
      determine, prior to attempting to commit the hardware transaction, whether or not the identified lock was successfully subscribed to;
      attempt to commit the hardware transaction, in response to determining that the identified lock was successfully subscribed to; and
      refrain from committing the hardware transaction, in response to determining that the identified lock was not successfully subscribed to.

3. The system of claim 1,
   wherein, in response to encountering, during execution of the critical section using the hardware transaction, an instruction that signals an end of the critical section, the thread is further configured to attempt, within the hardware transaction, to subscribe to the lock identified by the stored information;
   wherein to attempt to subscribe to the identified lock, the thread is configured to:
      read a value from the location identified by the information stored in the lock address register;
      determine, dependent on the value read from the identified location, whether or not the identified lock is held.

4. The system of claim 1,
   wherein, in response to encountering, during execution of the critical section using the hardware transaction, an instruction that signals an end of the critical section, the thread is further configured to attempt, within the hardware transaction, to subscribe to the lock identified by the stored information;
   wherein to attempt to subscribe to the identified lock, the thread is configured to:
      read values of one or more registers or memory locations that are associated with the identified lock;
      dereference a pointer to a location storing state information for the identified lock;
      compare values of two registers or memory locations that are associated with the identified lock to respective expected values;
      compare a state value for the identified lock to a value indicating that the identified lock is available; or
      apply a bitmask to a value that comprises state information for the identified lock and other information to obtain the state information for the identified lock.

5. The system of claim 1,
   wherein the identified lock is associated with a Boolean field for which a non-NULL value indicates that a thread that is holding the identified lock is executing in the critical section associated with the identified lock and for which a NULL value indicates that no thread is currently executing in the critical section under the identified lock;

wherein to store information identifying the lock in the designated location, the one or more processor cores are configured to write, to the designated location, a value identifying the location of the Boolean field;

wherein, in response to encountering, during execution of the critical section using the hardware transaction, an instruction that signals an end of the critical section, the thread is further configured to attempt, within the hardware transaction, to subscribe to the lock identified by the stored information; and wherein to attempt to subscribe to the identified lock, the thread is configured to determine whether or not the value of the Boolean field is NULL.

6. The system of claim 1, wherein the one of the one or more processor cores is further configured to:

enter, immediately prior to attempting to subscribe to the identified lock, a special mode in which attempts to execute code in the write set of the hardware transaction and attempts to read data in the write set of the hardware transaction are disallowed; and abort the hardware transaction in response to an attempt by the thread to execute code that is in the write set of the hardware transaction while in the special mode, in response to an attempt by the thread to read data that is in the write set of the hardware transaction while in the special mode, or in response to another thread acquiring the identified lock.

7. The system of claim 1, wherein to store information identifying the subscription code, the one or more processor cores are configured to write, to a subscription code address register, a value identifying the location of the subscription code.

8. The system of claim 1, wherein a protected memory area of a given size comprises the lock address register and the code address location; and wherein the one or more processor cores are configured to abort the hardware transaction in response to an attempt, during execution of the hardware transaction, to reduce the size of the protected memory area.

9. The system of claim 1, wherein the multithreaded application comprises two or more critical sections, each of which is associated with a lock of a different lock type; and wherein the subscription code identified by the information stored in the other designated location is dependent on the lock type of the lock associated with the critical section.

10. The system of claim 1, wherein, in response to encountering, during execution of the critical section using the hardware transaction, an instruction that signals an end of the critical section, the thread is further configured to attempt, within the hardware transaction, to subscribe to the lock identified by the stored information;

wherein to attempt to subscribe to the identified lock, the thread is configured to repeatedly read a value of a lock state indicator using a non-transactional load until the value indicates that the identified lock is available.

11. The system of claim 1, wherein the multithreaded application comprises two or more critical sections;

wherein the two or more critical sections comprise the critical section and a second critical section that is nested within the critical section;

wherein the second critical section is associated with a second lock; and wherein the one or more processor cores are further configured to:

store, prior to executing the second critical section, information identifying the second lock;

begin execution of the second critical section within the hardware transaction; and in response to encountering an instruction that signals an end of the second critical section:

attempt, within the hardware transaction, to subscribe to the second lock, wherein subscribing to the second lock comprises determining that the second lock is currently available;

determine, prior to attempting to commit the hardware transaction, whether or not the second lock was successfully subscribed to; and refrain from committing the hardware transaction, in response to determining that the identified lock was not successfully subscribed to or that the second lock was not successfully subscribed to.

12. A method, comprising:

performing by a computer that supports multithreading and that comprises a hardware transactional memory:

beginning execution of a multithreaded application that comprises a critical section that is associated with a lock;

storing, prior to executing the critical section by a thread of execution:

information identifying the lock that is associated with the critical section in a lock address register, wherein the information identifies the location at which the lock associated with the critical section resides in the hardware transactional memory;

information identifying a location of subscription code in a code address location, wherein the subscription code comprises program instructions executable to attempt to subscribe to the identified lock; and beginning execution, by the thread, of the critical section using a hardware transaction; and committing the hardware transaction conditioned on determining that the lock address register, the code address location, the subscription code and the identified lock have not been modified during execution of the hardware transaction.

13. The method of claim 12, further comprising:

encountering, during execution of the critical section using the hardware transaction, an instruction that signals an end of the critical section; and in response to said encountering:

attempting, within the hardware transaction, to subscribe to the lock identified by the stored information, wherein said attempting comprises determining that one or more of the stored information or the contents of the identified location has been modified during execution of the hardware transaction;

determining, prior to attempting to commit the hardware transaction and dependent on said attempting, that the identified lock was not successfully subscribed to; and aborting the hardware transaction, in response to determining that the identified lock was not successfully subscribed to.

14. The method of claim 13, wherein said attempting to subscribe to the lock comprises executing at least a portion of the identified subscription code.

15. A non-transitory, computer-readable storage medium storing program instructions that when executed on one or more computing nodes cause the one or more computing nodes to perform:
- beginning execution of a multithreaded application that comprises a critical section that is associated with a lock;
- storing, in a designated location prior to executing the critical section by a thread of execution:
  - information identifying the lock that is associated with the critical section in a lock address register, wherein the information identifies the location at which the lock associated with the critical section resides in the hardware transactional memory;
  - information identifying a location of subscription code in a code address location, wherein the subscription code comprises program instructions executable to attempt to subscribe to the identified lock; and
- beginning execution, by the thread, of the critical section using a hardware transaction; and
- committing the hardware transaction conditioned on determining that the lock address register, the code address location, the subscription code and the identified lock have not been modified during execution of the hardware transaction.

16. The non-transitory, computer-readable storage medium of claim 15, wherein when executed on one or more computing nodes, the program instructions further cause the one or more computing nodes to perform:
- encountering, during execution of the critical section using the hardware transaction, an instruction that signals an end of the critical section; and
- in response to said encountering:
  - attempting, within the hardware transaction, to subscribe to the lock identified by the stored information, wherein successfully subscribing to the identified lock comprises determining that the identified lock is currently available;
  - determining, prior to attempting to commit the hardware transaction and dependent on said attempting, whether or not the identified lock was successfully subscribed to;
  - attempting to commit the hardware transaction, in response to determining that the identified lock was successfully subscribed to; and
  - aborting the hardware transaction, in response to determining that the identified lock was not successfully subscribed to.

17. The non-transitory, computer-readable storage medium of claim 16, wherein said attempting to subscribe to the lock comprises one or more of:
- reading a value from the location identified by the information stored in the lock address register;
- dereferencing a pointer to a location storing state information for the identified lock;
- comparing values of two registers or memory locations that are associated with the identified lock to respective expected values;
- comparing a state value for the identified lock to a value indicating that the identified lock is available; or
- applying a bitmask to a value that comprises state information for the identified lock and other information to obtain the state information for the identified lock.

* * * * *

UNITED STATES PATENT AND TRADEMARK OFFICE
CERTIFICATE OF CORRECTION

PATENT NO. : 10,521,277 B2
APPLICATION NO. : 14/736123
DATED : December 31, 2019
INVENTOR(S) : Dice et al.

Page 1 of 1

It is certified that error appears in the above-identified patent and that said Letters Patent is hereby corrected as shown below:

On the Title Page

On page 2, Column 2, under Other Publications, Line 23, delete "Excecution"," and insert -- Execution", --, therefor.

In the Specification

In Column 1, Line 54, delete "Memory™" and insert -- Memory (TM) --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*